United States Patent
Finell et al.

(10) Patent No.: US 11,358,755 B2
(45) Date of Patent: Jun. 14, 2022

(54) FLEXIBLE FOODSTUFF CONTAINER WITH CLOSURE

(71) Applicant: Rebecca Finell, Austin, TX (US)

(72) Inventors: Rebecca M. Finell, Austin, TX (US); Joshua J. Nelson, Mesa, AZ (US)

(73) Assignee: ZIP TOP LLC, Austin, TX (US)

( * ) Notice: Subject to any disclaimer, the term of this patent is extended or adjusted under 35 U.S.C. 154(b) by 0 days.

(21) Appl. No.: 15/910,757

(22) Filed: Mar. 2, 2018

(65) Prior Publication Data
US 2018/0251267 A1    Sep. 6, 2018

Related U.S. Application Data

(60) Provisional application No. 62/466,156, filed on Mar. 2, 2017.

(51) Int. Cl.
*B65D 33/25* (2006.01)
*A47G 19/02* (2006.01)
(Continued)

(52) U.S. Cl.
CPC ......... *B65D 33/2508* (2013.01); *A47G 19/02* (2013.01); *A47G 19/2205* (2013.01);
(Continued)

(58) Field of Classification Search
CPC ............... B65D 33/25; B65D 33/2508; B65D 33/2516; B65D 33/2525; B65D 33/2533;
(Continued)

(56) References Cited

U.S. PATENT DOCUMENTS

| | | | |
|---|---|---|---|
| 1,769,186 A | 7/1930 | Morries | 607/110 |
| 1,879,602 A | 9/1932 | Copeman | 249/130 |

(Continued)

FOREIGN PATENT DOCUMENTS

| | | | | |
|---|---|---|---|---|
| CN | 101312889 A | 11/2008 | ............ | A44B 19/16 |
| EP | 0616948 A1 | 9/1994 | ............... | B65D 1/00 |

(Continued)

OTHER PUBLICATIONS

Partial European Search Report, Application No. 18159842.6, 9 pages.

(Continued)

*Primary Examiner* — Jes F Pascua
*Assistant Examiner* — Nina K Attel
(74) *Attorney, Agent, or Firm* — Slayden Grubert Beard PLLC

(57) ABSTRACT

A sealable container comprising: a base having a geometric shape; sides extending from the base and defining a mouth opposite the base, wherein cross-sections of the sides parallel to the base have a geometric shape; and a seal of the mouth comprising: a first zipper member and a second zipper member, wherein when the seal is closed to seal the mouth the first and second zipper members engage each other to make the seal and when the seal is open the first and second zipper members disengage to break the seal, wherein the base, sides and seal comprise silicone, wherein the base and at least a portion of the sides adjacent the base are of sufficient thickness and rigidity for the container to freely stand vertically on its base with the mouth at the top, and wherein the seal and at least a portion of the sides defining the mouth are sufficiently flexible to allow the seal and side portion to be deformed between open and closed mouth configurations.

19 Claims, 16 Drawing Sheets

(51) Int. Cl.

| | | |
|---|---|---|
| *A47G 19/22* | (2006.01) | |
| *B65D 33/00* | (2006.01) | |
| *B29C 35/02* | (2006.01) | |
| *B29C 43/00* | (2006.01) | |
| *B29C 43/18* | (2006.01) | |
| *B29C 45/00* | (2006.01) | |
| *B29C 45/14* | (2006.01) | |
| *B29K 83/00* | (2006.01) | |

(52) U.S. Cl.
CPC ............ *B29C 35/02* (2013.01); *B29C 43/003* (2013.01); *B29C 43/18* (2013.01); *B29C 45/0001* (2013.01); *B29C 45/14* (2013.01); *B65D 33/00* (2013.01); *B65D 33/25* (2013.01); *B65D 33/2541* (2013.01); *A47G 2400/10* (2013.01); *B29K 2083/00* (2013.01); *B29K 2083/005* (2013.01)

(58) Field of Classification Search
CPC .............. B65D 33/2541; B65D 33/255; B65D 33/2558; B65D 33/2566; B65D 33/2575; B65D 33/2583; B65D 33/2591; B65D 33/2584; B65D 33/2585; B65D 33/2586; B65D 33/25865; B65D 33/2587; B65D 33/2588; B65D 33/2589; B65D 33/259
USPC ...................... 383/61.1, 63, 64, 65
See application file for complete search history.

(56) References Cited

U.S. PATENT DOCUMENTS

| | | | | |
|---|---|---|---|---|
| 2,012,113 | A | 8/1935 | Thompson | 215/363 |
| 2,048,012 | A | 7/1936 | Leavens | 99/584 |
| 2,117,738 | A | 5/1938 | Otto | 220/266 |
| 2,165,277 | A | 7/1939 | Herman | 229/405 |
| 2,542,294 | A | 2/1951 | Smith | 383/40 |
| 2,563,933 | A | 8/1951 | Hipps et al. | 383/86 |
| 2,589,967 | A | 3/1952 | Sawyer | 215/372 |
| 2,595,328 | A | 5/1952 | Bowen | 607/114 |
| 2,800,269 | A | 7/1957 | Smith | 383/38 |
| 2,861,716 | A | 11/1958 | Kramer | 215/228 |
| 2,961,850 | A | 11/1960 | Tupper | 249/126 |
| 2,966,041 | A | 12/1960 | Zearfoss, Jr. et al. | 62/60 |
| 3,052,399 | A | 9/1962 | Brown | 383/204 |
| 3,306,567 | A | 2/1967 | Frei, Sr. | 249/53 R |
| 3,354,601 | A | 11/1967 | Schneider | 493/196 |
| 3,799,914 | A | 3/1974 | Schmit et al. | 426/85 |
| 3,804,077 | A | 4/1974 | Williams | 126/263.1 |
| 3,844,525 | A | 10/1974 | Parmett | 249/127 |
| 3,885,403 | A | 5/1975 | Spencer | 62/530 |
| 3,893,834 | A | 7/1975 | Armstrong | 62/4 |
| 4,055,188 | A | 10/1977 | Pelton | 607/112 |
| 4,527,566 | A | 7/1985 | Abare | 607/112 |
| 4,530,220 | A | 7/1985 | Nambu et al. | 62/530 |
| 4,587,810 | A | 5/1986 | Fletcher | 62/3.63 |
| D285,515 | S | 9/1986 | Papciak | D24/119 |
| 4,655,862 | A | 4/1987 | Christoff et al. | 156/66 |
| 4,676,247 | A | 6/1987 | Van Cleve | 607/112 |
| D291,659 | S | 9/1987 | Powell | D7/507 |
| 4,783,042 | A | 11/1988 | Folkmar | 249/127 |
| 4,813,646 | A | 3/1989 | Fujio | 249/55 |
| 4,883,251 | A | 11/1989 | Manas | 249/53 R |
| 5,046,860 | A | 9/1991 | Brennan | 383/38 |
| 5,148,804 | A | 9/1992 | Hill et al. | 607/108 |
| 5,215,080 | A | 6/1993 | Thomas et al. | 607/112 |
| 5,237,838 | A | 8/1993 | Merritt-munson | 62/457.2 |
| 5,350,045 | A | 9/1994 | Robertson | 190/110 |
| 5,499,763 | A | 3/1996 | Demars | 229/114 |
| D374,204 | S | 10/1996 | Weder | D11/143 |
| 5,689,866 | A * | 11/1997 | Kasai | B65D 33/2541 24/400 |
| 5,692,837 | A | 12/1997 | Beer | 373/210.1 |
| 5,758,473 | A | 6/1998 | Patelli | 53/412 |
| 5,782,562 | A | 7/1998 | Anspacher | 383/15 |
| D399,708 | S | 10/1998 | Grissom | D07/629 |
| D401,141 | S | 11/1998 | Carroll et al. | D09/608 |
| D407,970 | S | 4/1999 | Planchard | D9/703 |
| 5,906,438 | A | 5/1999 | Laudenberg | 383/63 |
| D418,368 | S | 1/2000 | Solland | D7/510 |
| D418,747 | S | 1/2000 | Sagel | D9/707 |
| D419,867 | S | 2/2000 | Hager et al. | D09/608 |
| 6,050,432 | A | 4/2000 | Koehnke | 215/11.3 |
| D423,877 | S | 5/2000 | Kerr | D07/509 |
| 6,076,967 | A | 6/2000 | Beaudette | 383/41 |
| 6,164,488 | A | 12/2000 | Solland | 220/717 |
| 6,164,822 | A | 12/2000 | Beer | 383/38 |
| 6,164,826 | A | 12/2000 | Petkovsek | 383/210.1 |
| 6,176,420 | B1 | 1/2001 | Sarson | 229/128 |
| 6,197,359 | B1 * | 3/2001 | Llorente Hompanera | A23G 1/226 220/573.1 |
| 6,245,367 | B1 | 6/2001 | Galomb | 426/115 |
| D445,223 | S | 7/2001 | Butler | D30/145 |
| 6,325,543 | B1 | 12/2001 | Ausnit | 383/210.1 |
| D456,211 | S | 4/2002 | Price | D7/509 |
| D457,318 | S | 5/2002 | Borland et al. | D03/303 |
| D464,258 | S | 10/2002 | Edwards | D09/708 |
| 6,470,705 | B2 | 10/2002 | Bride-Flynn | 62/530 |
| D470,361 | S | 2/2003 | Trombly | D7/509 |
| D470,755 | S | 2/2003 | Espinel | D9/707 |
| D482,614 | S | 11/2003 | Countee, Jr. | D09/430 |
| D495,209 | S | 8/2004 | Tranfaglia | D7/509 |
| D502,364 | S | 3/2005 | Chan | D7/509 |
| 6,945,988 | B1 | 9/2005 | Jones | 607/108 |
| 7,029,178 | B2 | 4/2006 | Gzybowski | 383/64 |
| D522,183 | S | 5/2006 | Wylie | D30/118 |
| 7,065,983 | B2 | 6/2006 | Trinh et al. | 62/530 |
| 7,160,029 | B2 | 1/2007 | Bein et al. | 383/67 |
| D541,171 | S | 4/2007 | Delmotte et al. | D09/709 |
| 7,197,893 | B2 | 4/2007 | Trinh et al. | 62/530 |
| 7,204,641 | B2 | 4/2007 | Stolmeier | 383/64 |
| D553,442 | S | 10/2007 | Bodum | D7/509 |
| D554,432 | S | 11/2007 | Roth et al. | D07/516 |
| D567,592 | S | 4/2008 | Fite, IV et al. | D07/568 |
| D580,779 | S | 11/2008 | Hartwell et al. | D09/705 |
| D582,790 | S | 12/2008 | Friebe | D9/707 |
| D586,232 | S | 2/2009 | Friebe | D9/707 |
| 7,524,111 | B1 | 4/2009 | Williams | 220/23.87 |
| D600,072 | S | 9/2009 | Hayes | D7/509 |
| D605,895 | S | 12/2009 | Abbott | D7/509 |
| D609,581 | S | 2/2010 | Doyal | D09/703 |
| D616,760 | S | 6/2010 | Deuerer | D09/611 |
| D618,302 | S | 6/2010 | Williams | D23/209 |
| D622,109 | S | 8/2010 | Hull et al. | D7/630 |
| D627,608 | S | 11/2010 | Markum | D07/672 |
| 1,002,346 | A1 | 9/2011 | Weeks | 229/400 |
| 8,070,359 | B2 | 12/2011 | Taheri | 383/66 |
| D657,950 | S | 4/2012 | Herman | D3/202 |
| D660,446 | S | 5/2012 | Baltazar | D24/208 |
| 8,182,407 | B2 | 5/2012 | Yeager | 493/213 |
| 8,209,995 | B2 | 7/2012 | Kieling et al. | 62/457.1 |
| 8,220,651 | B2 | 7/2012 | Norcom | 220/1.6 |
| D668,118 | S | 10/2012 | Hayes et al. | D07/602 |
| D672,202 | S | 12/2012 | Craft et al. | D07/586 |
| D683,190 | S | 5/2013 | Shields | D07/544 |
| D683,592 | S | 6/2013 | Shields | D07/544 |
| D684,867 | S | 6/2013 | English | D9/707 |
| D684,868 | S | 6/2013 | Kessler | D9/707 |
| D686,508 | S | 7/2013 | Kling | D9/703 |
| 8,479,972 | B2 | 7/2013 | Craft et al. | 229/101 |
| D689,370 | S | 9/2013 | Bower | D9/707 |
| 8,523,440 | B2 | 9/2013 | Walker et al. | 383/202 |
| D690,995 | S | 10/2013 | Franco | D07/516 |
| 8,690,428 | B2 | 4/2014 | Kruse et al. | 383/5 |
| 8,696,797 | B2 | 4/2014 | Steele | 95/172 |
| D705,654 | S | 5/2014 | Wurth et al. | D09/451 |
| 8,864,015 | B2 | 10/2014 | Lu | 229/128 |
| D722,805 | S | 2/2015 | Banos | D07/301 |
| D736,099 | S | 8/2015 | Deuerer | D09/707 |
| D739,727 | S | 9/2015 | Olson | D9/436 |
| 9,144,278 | B2 | 9/2015 | Morrow | |
| D750,334 | S | 2/2016 | Comstock | D32/30 |

(56) References Cited

U.S. PATENT DOCUMENTS

| | | | | |
|---|---|---|---|---|
| D755,017 S | 5/2016 | Piechocinski | | D07/584 |
| 9,371,153 B1 | 6/2016 | Nouri et al. | | |
| D770,916 S | 11/2016 | Nouri et al. | | D09/709 |
| D772,493 S | 11/2016 | Wu | | D30/129 |
| D772,723 S | 11/2016 | Murray | | D9/707 |
| D782,450 S | 3/2017 | Jones | | D14/240 |
| D784,157 S | 4/2017 | Ross | | D09/705 |
| D791,609 S | 7/2017 | Rotman | | D9/611 |
| 9,737,161 B1 | 8/2017 | Li | | |
| 9,751,655 B2 | 9/2017 | Herman | | |
| D804,959 S | 12/2017 | Anda | | D9/705 |
| D809,875 S | 2/2018 | Delgado Carmona | | D7/628 |
| D809,876 S | 2/2018 | Delgado Carmona | | D7/628 |
| D811,796 S | 3/2018 | Joseph | | D7/325 |
| D812,487 S | 3/2018 | Soegyanto | | D9/702 |
| D813,684 S | 3/2018 | Williams, Jr. et al. | | D9/703 |
| D815,365 S | 4/2018 | Scariot et al. | | D30/118 |
| D815,544 S | 4/2018 | Soegyanto | | D9/702 |
| D817,109 S | 5/2018 | Kilicarslan | | D7/611 |
| D826,063 S | 8/2018 | Kwon et al. | | D9/643 |
| D831,432 S | 10/2018 | Lv | | D7/606 |
| D851,853 S | 6/2019 | Khan | | D99/5 |
| D854,325 S | 7/2019 | Myerson | | D3/304 |
| D856,086 S | 8/2019 | Goulet | | D7/519 |
| D858,200 S | 9/2019 | Wang | | D7/516 |
| D860,001 S | 9/2019 | Sahatjian | | D9/707 |
| 10,407,217 B1 | 9/2019 | Nouri et al. | | |
| 10,421,584 B2 | 9/2019 | Ross | | |
| D874,876 S | 2/2020 | Finell et al. | | D7/602 |
| D876,172 S | 2/2020 | Finell et al. | | D7/602 |
| D876,891 S | 3/2020 | Finell et al. | | D7/509 |
| D886,533 S | 6/2020 | Finell et al. | | D7/602 |
| D886,534 S | 6/2020 | Finell et al. | | D7/602 |
| D889,205 S | 7/2020 | Said | | D7/523 |
| D904,896 S | 12/2020 | Unterlechner | | D9/703 |
| D904,897 S | 12/2020 | Unterlechner | | D9/703 |
| D905,564 S | 12/2020 | Unterlechner | | D9/703 |
| 2003/0066870 A1 | 4/2003 | Stewart | | 229/125.09 |
| 2004/0004010 A1 | 1/2004 | Versluys | | 206/219 |
| 2004/0146224 A1 | 7/2004 | Piotrowski et al. | | 383/64 |
| 2004/0211879 A1 | 10/2004 | Stalnecker et al. | | 249/121 |
| 2004/0244413 A1 | 12/2004 | Trinh et al. | | 62/530 |
| 2005/0194386 A1 | 9/2005 | Shai | | 220/287 |
| 2006/0093242 A1 | 5/2006 | Anzini et al. | | 383/63 |
| 2006/0171609 A1 | 8/2006 | Turvey et al. | | 383/63 |
| 2006/0191929 A1 | 8/2006 | Berg, Jr. et al. | | 220/6 |
| 2006/0191985 A1 | 8/2006 | Norcom | | 229/117.05 |
| 2006/0193541 A1 | 8/2006 | Norcom | | 383/200 |
| 2007/0130733 A1 | 6/2007 | Kasai | | 24/585.12 |
| 2007/0164192 A1 | 7/2007 | Holden et al. | | 249/98 |
| 2007/0175787 A1 | 8/2007 | Lown et al. | | 206/427 |
| 2008/0050053 A1* | 2/2008 | Szczesuil | | B65D 33/02 383/66 |
| 2008/0063318 A1 | 3/2008 | Gattino | | 383/21 |
| 2008/0087268 A1* | 4/2008 | Burton | | B65D 33/1641 126/9 R |
| 2008/0089618 A1 | 4/2008 | Blythe | | 383/25 |
| 2008/0277310 A1 | 11/2008 | Chacon | | 206/568 |
| 2009/0038656 A1 | 2/2009 | Ahrenholtz et al. | | 134/135 |
| 2009/0110335 A1* | 4/2009 | LeBoeuf | | B65D 81/18 383/63 |
| 2009/0136161 A1 | 5/2009 | Hickey | | 383/66 |
| 2009/0279810 A1* | 11/2009 | Nobles | | A45C 13/00 383/66 |
| 2010/0012531 A1 | 1/2010 | Steele | | 206/216 |
| 2010/0072224 A1 | 3/2010 | Ha | | 222/107 |
| 2010/0159083 A1 | 6/2010 | Peplinski et al. | | 426/113 |
| 2010/0159096 A1 | 6/2010 | Sam | | 426/394 |
| 2010/0300919 A1 | 12/2010 | Alipour | | 206/524.8 |
| 2010/0314434 A1 | 12/2010 | Herman | | 229/107 |
| 2011/0017812 A1 | 1/2011 | Belko et al. | | 229/117.27 |
| 2011/0017814 A1 | 1/2011 | Belko et al. | | 229/124 |
| 2011/0132910 A1* | 6/2011 | Willat | | A47G 19/2205 220/495.03 |
| 2011/0203944 A1 | 8/2011 | Singer | | 206/204 |
| 2011/0297680 A1 | 12/2011 | Howell et al. | | 220/266 |
| 2012/0060449 A1 | 3/2012 | Howell et al. | | 53/456 |
| 2012/0187182 A1 | 7/2012 | Howell et al. | | 229/102 |
| 2012/0269469 A1 | 10/2012 | Long et al. | | 383/210.1 |
| 2013/0084028 A1 | 4/2013 | Cross | | 383/33 |
| 2013/0105352 A1* | 5/2013 | Munguia | | B65D 81/3461 206/524.6 |
| 2013/0277367 A1 | 10/2013 | Kozarsky et al. | | 220/315 |
| 2014/0042217 A1 | 2/2014 | Houck | | 229/404 |
| 2014/0212075 A1 | 7/2014 | Cross | | 383/64 |
| 2014/0226921 A1* | 8/2014 | Albers | | B65D 33/25 383/86.2 |
| 2014/0245698 A1 | 9/2014 | Steele | | 53/410 |
| 2014/0270579 A1* | 9/2014 | Nouri | | B65D 33/2541 383/25 |
| 2015/0202832 A1 | 7/2015 | Denis et al. | | 383/63 |
| 2015/0203250 A1* | 7/2015 | Denis | | B65D 33/2566 383/63 |
| 2016/0137374 A1 | 5/2016 | Brosch et al. | | 383/104 |
| 2016/0145030 A1 | 5/2016 | Malligan et al. | | 426/120 |
| 2017/0036822 A1 | 2/2017 | Sam | | 383/38 |
| 2018/0148228 A1 | 5/2018 | Bray | | |
| 2018/0251267 A1 | 9/2018 | Finell | | |
| 2018/0370109 A1 | 12/2018 | Shaw | | |
| 2019/0270546 A1 | 9/2019 | Finell | | |

FOREIGN PATENT DOCUMENTS

| | | | |
|---|---|---|---|
| JP | D140735 S | 11/2010 | |
| JP | D1454613 S | 11/2012 | |
| JP | 1481231 S | 10/2013 | |
| JP | 1611864 S | 8/2018 | |
| JP | D1625224 S | 2/2019 | |
| JP | D1630549 S | 5/2019 | |
| JP | D1630736 S | 5/2019 | |
| JP | 1655101 S | 3/2020 | |
| JP | 1661295 S | 6/2020 | |
| TW | M515388 | 1/2016 | A61J 1/05 |
| WO | 98/12488 A1 | 3/1998 | B65D 33/25 |
| WO | 2016/140746 A1 | 9/2016 | G01F 19/00 |

OTHER PUBLICATIONS

Extended European Search Report and Written Opinion, Application No. 18159842.6, 9 pages, dated Oct. 19, 2018.

Chinese Office Action, Application No. 201830098713.5, 1 page, dated Jul. 5, 2018.

Chinese Office Action, Application No. 201830099279.2, 1 page, dated Jul. 9, 2018.

Chinese Office Action, Application No. 201830098714.X, 1 pages, dated Jul. 11, 2018.

Chinese Office Action, Application No. 201830099010.4, 1 page, dated Jul. 11, 2018.

Taiwan Office Action, Application No. 107301545, 6 pages, dated Sep. 12, 2018.

Taiwan Office Action, Application No. 107301546, 5 pages, dated Sep. 12, 2018.

Taiwan Office Action, Taiwan Design Application No. 107301543, 4 pages, dated Dec. 18, 2018.

U.S. Non-Final Office Action, U.S. Appl. No. 15/910,757, 18 pages, dated Jun. 14, 2019.

U.S. Non-Final Office Action, U.S. Appl. No. 16/154,134, 39 pages, dated Oct. 1, 2019.

U.S. Non-Final Office Action, U.S. Appl. No. 29/699,634, 14 pages, daated Oct. 21, 2019.

U.S. Non-Final Office Action, U.S. Appl. No. 29/699,650, 14 pages, dated Oct. 21, 2019.

U.S. Non-Final Office Action, U.S. Appl. No. 29/699,656, 14 pages, dated Oct. 21, 2019.

U.S. Notice of Allowance, U.S. Appl. No. 29/699,611, 16 pages, dated Oct. 30, 2019.

International Search Report and Written Opinion, Application No. PCT/US2019/054935, 11 pages, dated Feb. 4, 2020.

(56) References Cited

OTHER PUBLICATIONS

Taiwan Office Action, Application No. 107301546, 30 pages, dated Feb. 10, 2020.
Taiwan Office Action, Application No. 107301545, 20 pages, dated Feb. 10, 2020.
U.S. Non-Final Office Action, U.S. Appl. No. 16/296,416, 43 pages, dated Mar. 13, 2020.
U.S. Non-Final Office Action, U.S. Appl. No. 29/618,115, 27 pages, dated Nov. 27, 2019.
U.S. Non-Final Office Action, U.S. Appl. No. 29/618,138, 27 pages, dated Nov. 29, 2019.
U.S. Non-Final Office Action, U.S. Appl. No. 29/618,099, 27 pages, dated Nov. 29, 2019.
U.S. Notice of Allowance, U.S. Appl. No. 29/699,278, 19 pages, dated Dec. 4, 2019.
U.S. Notice of Allowance, U.S. Appl. No. 29/699,301, 19 pages, dated Dec. 4, 2019.
U.S. Notice of Allowance, U.S. Appl. No. 29/699,897, 18 pages, dated Dec. 4, 2019.
U.S. Notice of Allowance, U.S. Appl. No. 29/699,904, 19 pages, dated Dec. 4, 2019.
International Search Report and Written Opinion, Application No. PCT/US2020/017893, 12 pages, dated May 20, 2020.
U.S. Advisory Action, U.S. Appl. No. 16/154,134, 4 pages, dated Jun. 12, 2020.
Japanese Office Action, Application No. 2020001090, 9 pages, dated Jun. 15, 2020.
Japanese Office Action, Application No. 2020001093, 9 pages, dated Jun. 15, 2020.
Japanese Office Action, Application No. 2020001101, 8 pages, dated Jun. 15, 2020.
Japanese Office Action, Application No. 2020001087, 8 pages, dated Jun. 15, 2020.
Japanese Office Action, Application No. 2020001088, 8 pages, dated Jun. 15, 2020.
Japanese Office Action, Application No. 2020001089, 9 pages, dated Jun. 15, 2020.
U.S. Final Office Action, U.S. Appl. No. 16/296,416, 19 pages, dated Jul. 16, 2020.
U.S. Non-Final Office Action, U.S. Appl. No. 16/154,134, 29 pages, dated Sep. 24, 2020.
U.S. Non-Final Office Action, U.S. Appl. No. 16/296,416, 24 pages, dated Feb. 23, 2021.
Chinese Office Action, Application No. 201810176215.7, 6 pages, dated May 27, 2021.
Japanese Office Action, Application No. 20201088, 6 pages, dated Jun. 1, 2021.
Japanese Office Action, Application No. 20201089, 6 pages, dated Jun. 1, 2021.
Japanese Office Action, Application No. 20201090, 6 pages, dated Jun. 1, 2021.
Japanese Office Action, Application No. 20201093, 6 pages, dated Jun. 1, 2021.
Japanese Office Action, Application No. 20201087, 6 pages, dated Jun. 1, 2021.
U.S. Non-Final Office Action, U.S. Appl. No. 29/699,320, 38 pages, dated Jun. 30, 2021.
U.S. Non-Final Office Action, U.S. Appl. No. 29/699,437, 38 pages, dated Jun. 30, 2021.
U.S. Non-Final Office Action, U.S. Appl. No. 29/699,459, 38 pages, dated Jun. 30, 2021.
Israeli Office Action, Application No. 281973, 5 pages, dated Oct. 21, 2021.
U.S. Non-Final Office Action, U.S. Appl. No. 17/360,233, 39 pages, dated Dec. 29, 2021.
Chinese Office Action, Application No. 201810176215.7, 11 pages, dated Jan. 29, 2022.
U.S. Final Office Action, U.S. Appl. No. 17/360,233, 13 pages, dated Mar. 14, 2022.

\* cited by examiner

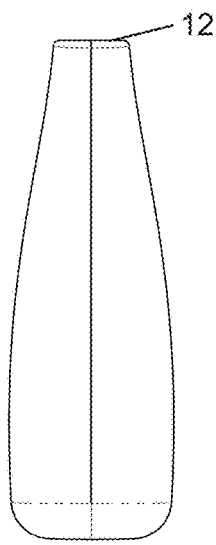
FIG. 1H
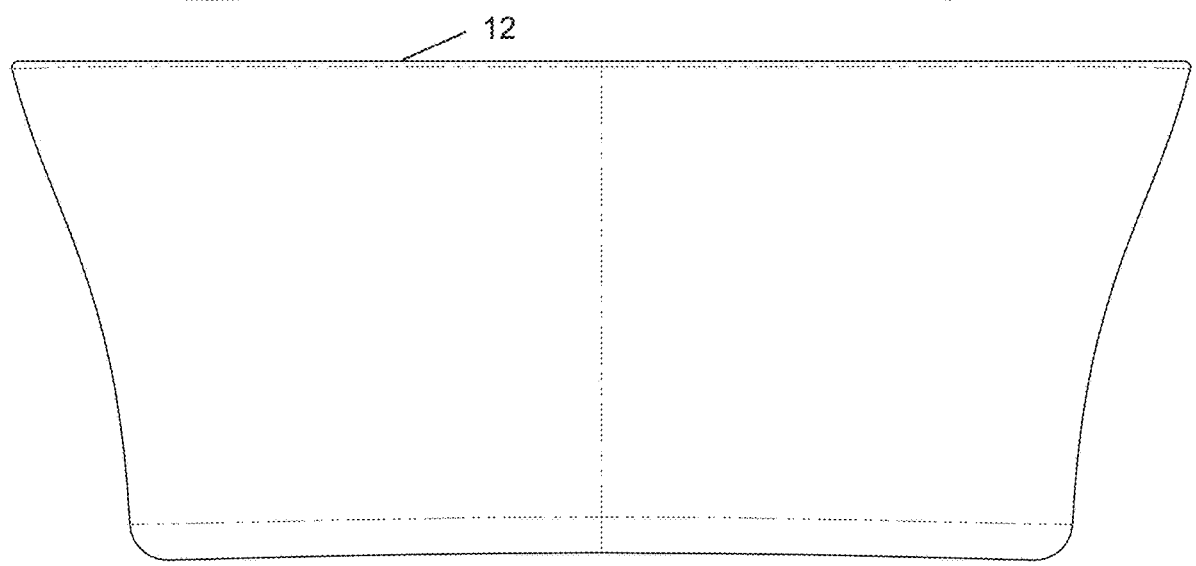
FIG. 1I
FIG. 1J
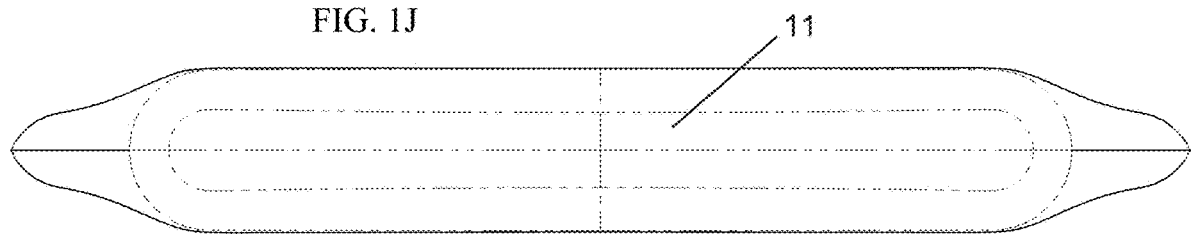

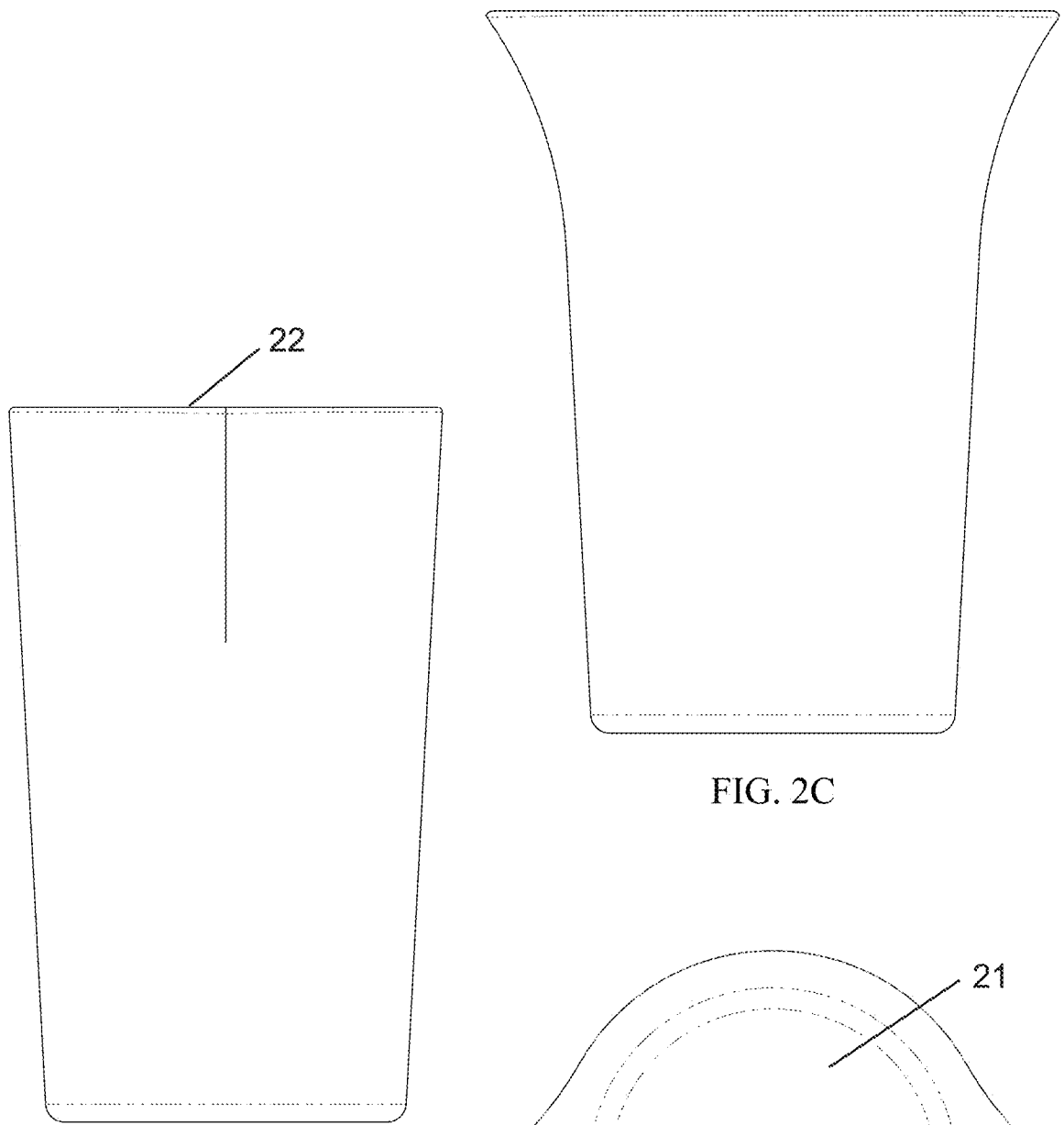
FIG. 2C
FIG. 2D
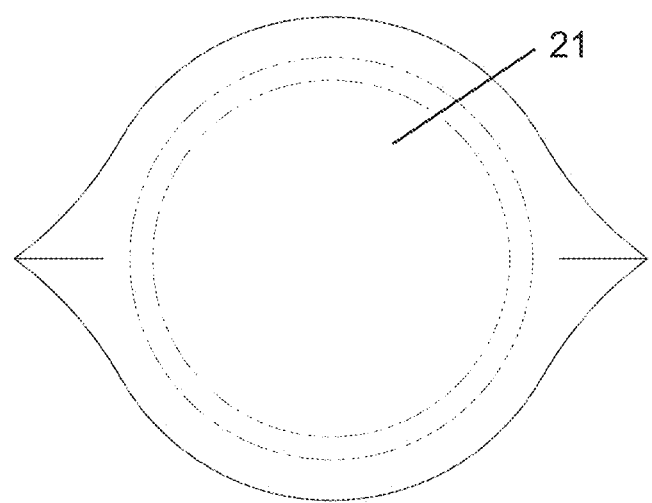
FIG. 2E

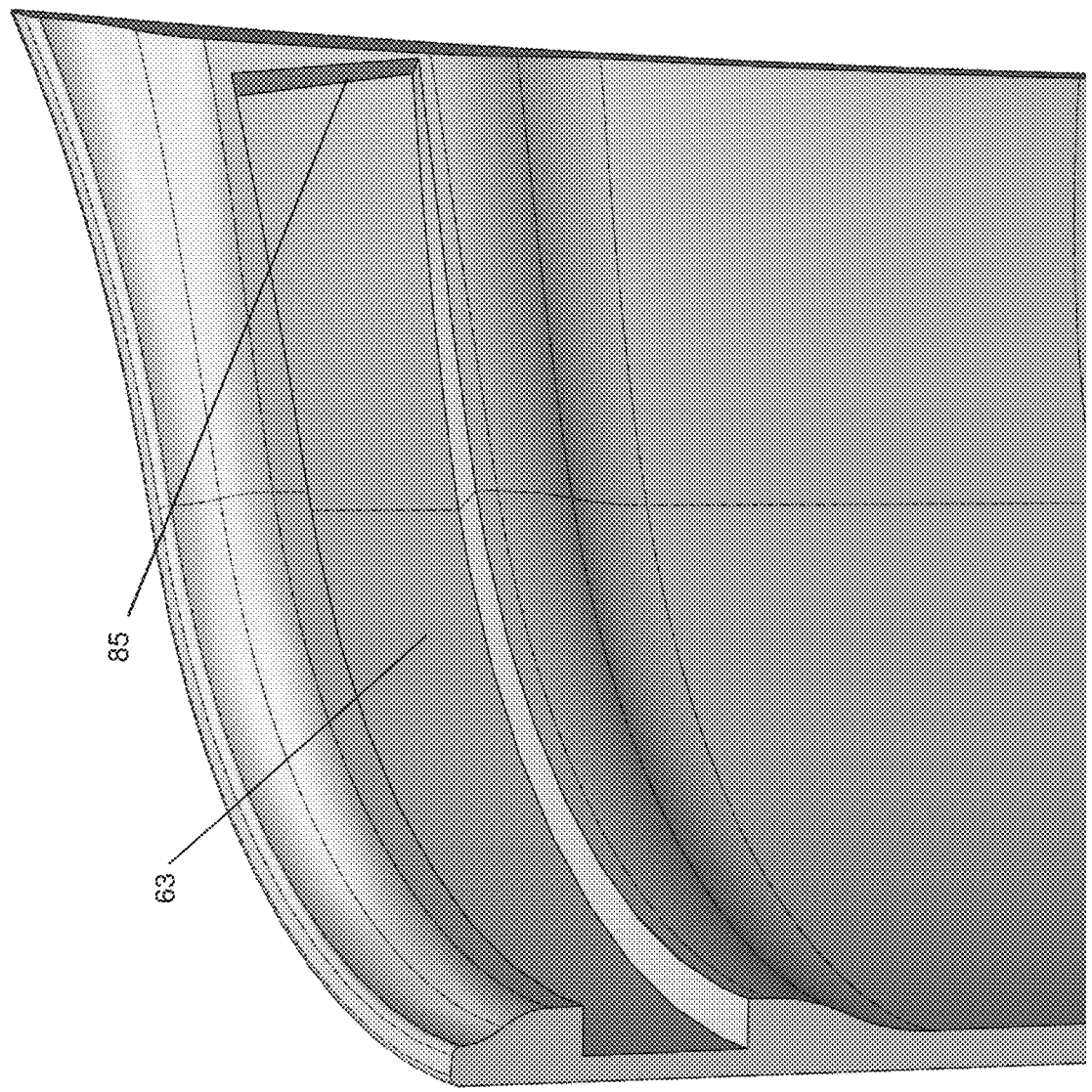

FLEXIBLE FOODSTUFF CONTAINER WITH CLOSURE

RELATED PATENT APPLICATION

This application claims priority to commonly owned U.S. Provisional Patent Application No. 62/466,156; filed Mar. 2, 2017, which is hereby incorporated by reference herein for all purposes.

TECHNICAL FIELD

The present disclosure relates generally to the field of sealable cups, bowls and tumblers made of silicone suitable for foodstuffs.

BACKGROUND

U.S. Pat. No. 6,197,359, incorporated herein by reference, describes the use of silicone for manufacturing of confectionery molds and baking receptacles, wherein silicone may be used for applications in contact with foodstuffs, in particular, methyl-vinyl-polysiloxane obtained by a process of cross-linking with platinum. Silicone is a material of polymeric nature whose chains are made up of alternating oxygen and silicon atoms. Silicones are normally prepared by hydrolysis and subsequent polymerisation of alkylhalogensilanes (both acid- and base-catalysed). The alkylhalogensilanes are in practice made by a direct process, Cu-catalysed, in which the Si reacts with the corresponding alkyl halide. This process provides mixtures of products, whose composition can be modified by a process of redistribution to yield the desired monomer. Known in the art are silicone elastomers, which are made up of linear polymers. A cross-linking phase is required in order to provide the elastic properties. The most common elastomers are those deriving from dichloromethylsilane, with molecular weights ranging between 300,000 and 700,000. They are made by a prepolymerisation that provides octamethylcyclotetrasiloxane, purification thereof and subsequent polymerisation in the presence of a small quantity of monofunctional material in order to control the molecular weight, followed by a cross-linking similar to curing, in the presence of peroxides, which lends the material its elastic properties. Other important elastomers are those that contain a small proportion (0.1% molar) of vinyl groups linked to silicon, which undergo much more effective curing, and those that contain between 10 and 15% molar of phenyl groups, and good elastic properties at low temperatures. Elastomers of a much lower molecular weight (10,000 to 100,000) can be obtained by using linear polymer chains ending in silanol groups, which can be cured at room temperature by reaction with an alkoxylane. In general, the most important characteristic of the silicone elastomers is the fact that they present a very broad thermal spectrum of use (from −50° C. to 200° C.) without a significant alteration of their properties. They have good electrical insulation properties, do not self-oxidise or undergo attack by chemical agents in aqueous medium and swell in the presence of non-polar organic solvents, although some special types that contain fluoro- or cyano-groups offer greater resistance to this process. Silicone elastomers find their widest industrial application as electrical insulators, fluid-repellents and oxidation protectors, and in the manufacturing of hermetic gaskets. The silicones are highly inert materials, and they repel water. Silicone is inert to chemical agents, with the exception of strong bases and acids, and its toxicity is generally low. The origin of these properties lies essentially in the high stability of the Si—O bond (106 Kcal/mol), and in its strong partial ionic character. Other known uses of silicones are in the manufacturing of containers for liquids (such as wineskins) and tubes for transporting substances (such as the tubes used for blood transfusions).

U.S. Publication 2014/0270579, incorporated herein by reference, discloses a silicone bag. In particular, the publication teaches a bag having a front and back portion which are comprised of silicone or a similar elastomer. The front and back portion are identical in size and are sealed together along their sides and bottom with an mouth along the top portion. The mouth creates a cavity from which items are placed in and stored or transported for further use. A sealing mechanism (ribs pressed into slots) on top of the bag seals items in the bag. The bag is molded entirely of silicone, including the sealing mechanism, to be water tight.

U.S. Publication 2014/0245698, incorporated herein by reference, discloses a package having a foldable top region. The package generally includes panel portions that at least partially define an interior cavity therebetween and accessible through an access mouth. The top portion can provide a cuff member or cuff region that can be folded and unfolded to facilitate use of the package as a bowl or other cuffed container for material contents. The package can be adapted to hold its shape as a bowl or cuffed container. A reclosure member can be provided to facilitate re-sealing of the package. A folding strip, edge contours and stiffening members can also be provided.

U.S. Publication 2009/0110335, incorporated herein by reference, discloses a reclosable food storage bag able to withstand a wide temperature range manufactured from environmentally sensitive materials is disclosed. The bag can be manufactured from such materials as silicone rubber and thermoset resins. By using such materials, the bag can easily withstand the temperature ranges encountered in residential kitchens extending from the freezer to the oven and all ambient temperatures therebetween. In addition, by manufacturing the bag from such materials, the environmental impact of using petroleum based polymers is avoided.

U.S. Pat. No. 9,371,153, incorporated herein by reference, discloses a container made of an elastomer such as silicone with an integrated leak resistant seal having press-fit elements. The sizes and shapes of the press-fit elements seal the mouth to resist leakage of liquids from inside the container. No external clips or clasps are needed for the seal. Extended flaps facilitate pulling the sides open. The container itself may be of asymmetrical shape, e.g. trapezoidal.

SUMMARY

In accordance with the teachings of the present disclosure, sealable cups, bowls and tumblers made of silicone suitable for foodstuffs are provided.

An aspect of the invention provides a sealable container comprising: a base having a geometric shape; sides extending from the base and defining a mouth opposite the base, wherein cross-sections of the sides parallel to the base have a geometric shape; and a seal of the mouth comprising: a first zipper member and a second zipper member, wherein when the seal is closed to seal the mouth the first and second zipper members engage each other to make the seal and when the seal is open the first and second zipper members disengage to break the seal, wherein the base, sides and seal comprise silicone, wherein the base and at least a portion of the sides adjacent the base are of sufficient thickness and rigidity for the container to freely stand vertically on its base with the mouth at the top, and wherein the seal and at least a portion of the sides defining the mouth are sufficiently flexible to allow the seal and side portion to be deformed between open and closed mouth configurations.

A further aspect of the invention provides a sealable container comprising: a base having a geometric shape; sides connected to the base and defining an mouth opposite the base, wherein cross-sections of the sides have a geometric shape; and a seal of the mouth, wherein the base and at least a portion of the sides adjacent the base are sufficiently rigid to resist deformation in response to applied forces, wherein the mouth and at least a portion of the sides adjacent the mouth are sufficiently flexible to allow the mouth to be deformed between open and closed configurations, and wherein the base, sides and seal are integrally formed of silicone.

BRIEF DESCRIPTION OF THE DRAWINGS

A more complete understanding of the present embodiments may be acquired by referring to the following description taken in conjunction with the accompanying drawings, in which like reference numbers indicate like features.

FIGS. 1H, 1I and 1J show end, side and bottom views, respectively, of the short container of FIGS. 1F and 1G.

FIGS. 2C, 2D and 2E show end, side and bottom views, respectively, of the tumbler of FIGS. 2A and 2B.

FIG. 7A shows a zipper slot and a slot end in a side of a tumbler.

DETAILED DESCRIPTION

Figure 1A:
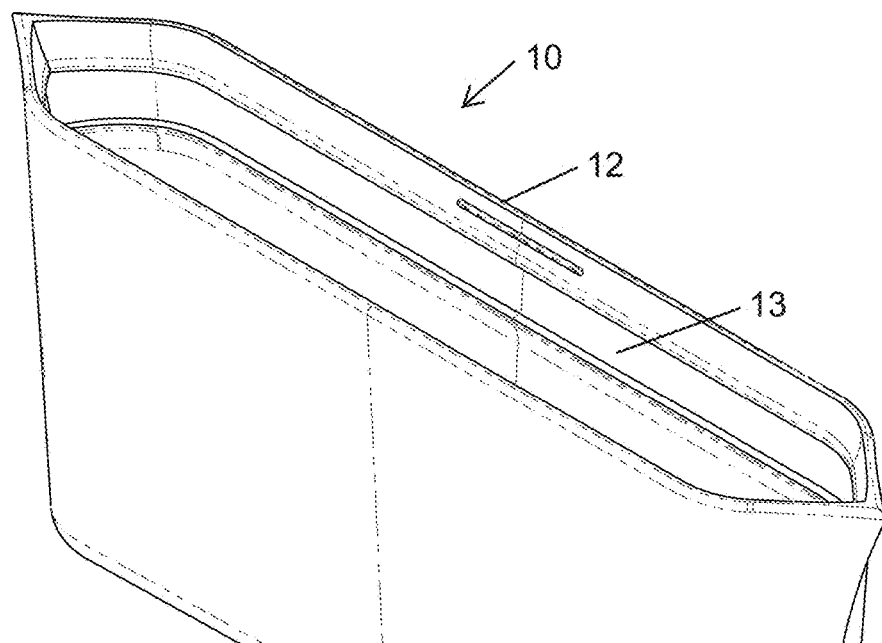
FIGS. 1A and 1B illustrate perspective views of a short container in an open configuration.

Preferred embodiments are best understood by reference to FIGS. 1-8 below in view of the following general discussion. The present disclosure may be more easily understood in the context of a high level description of certain embodiments.

Embodiments of the present invention provide a cup or a bowl that stands on its own and zips at the top like a re-sealable zipper storage bag. The cup or bowl may be made with silicone in one piece, be flexible, be food grade, and be dishwasher/microwave safe. The cup or bowl may be used as a dish/cup. The cup or bowl may be used as a storage container. In particular, the cup or bowl may be great for travel.

The material may be thicker at the base for stability. The top may be thinner and more flexible. The zipper may be a tongue and groove configuration wherein a male portion is mated with a female portion to make the seal. The zipper may be a dual zipper or triple zipper. A clasp may be assembled to the exterior of the zipper for sliding along the zipper to assist with the mouth and/or closing of the zipper.

In one embodiment, the zipper portion and the container portion may be molded as one unitary whole of the same material throughout. Alternatively, the zipper portion may be made from a harder durometer or different material inserted into the mold, so that it may be a dual-durometer or co-molded product.

In another embodiment, the zipper members may be separate pieces joined to a zipper slot of the container piece by glue, adhesive, tape, weld, bond, etc. Silicone adhesives are commercially available from LocTite, 3M and GE. Alternatively, because silicone bonds well to silicone, silicone may be used to join the zipper members to the container. According to one process, the zipper members and container may be made to adhere by placing them in contact when the silicone material is not fully crosslinked (cured) after being separately molded. In this case, it is preferable not to postbake the parts prior to performing the silicone adhesion step. Alternatively, the zipper members may first be separately molded and then placed inside the container mold so that when the container is molded, the zipper members become "overmolded" or "encapsulated" by the liquid silicone being injected in the mold to form the container, and thereby become joined to the container.

According to certain embodiments of the invention, one feature is to have a free standing container with a zipper seal of the mouth at the top, wherein the mouth remains open when unsealed. A benefit to users is that the mouth of the contain remains open in a free standing position, so users may pour or spoon contents into or out of the container without having to hold open the mouth of the container. To enable this feature, the container may be silicone molded in in an open position, so that the finished container naturally wants to assume an open position. The zipper members may be silicone molded in straight molds so that by themselves they naturally tend to assume straight positions. When the zipper members are then joined in the zipper slots of the container, the combination tends to cause the mouth of the container to naturally assume an open eye-shape when free-standing.

The figures show perspective, side and end views of separate cups, bowls or containers. Each cup, bowl or container is made of a flexible material that is sufficiently rigid in the base regions to stand on their own, but sufficiently flexible in the closure region to allow the mouths to transition between open and closed configurations.

FIGS. 1A-1J show perspective, side and end views of a short container. The short container 10 comprises a base 11 that is generally oval in shape. The short container 10 further comprises a mouth 12 at the top, wherein the mouth is generally circular when open and general linear when closed. The base 11 comprises a wall thickness and material composition that has sufficient stiffness or rigidity to resist deformation in response to applied forces. The mouth 12 comprises wall thicknesses and material compositions that are sufficiently flexible or pliable to allow the mouth 12 to be deformed between open and closed configurations. In one embodiment, the short container 10 may have wall thicknesses or rigidity that vary uniformly from the base 11 to the mouth 12, wherein the wall thicknesses are thicker or more rigid at the base 11 and thinner or less rigid at the mouth 12. The short container 10 may have a zipper slot 13 near the mouth 12 to seal the mouth in a closed configuration.

Figure 1B:
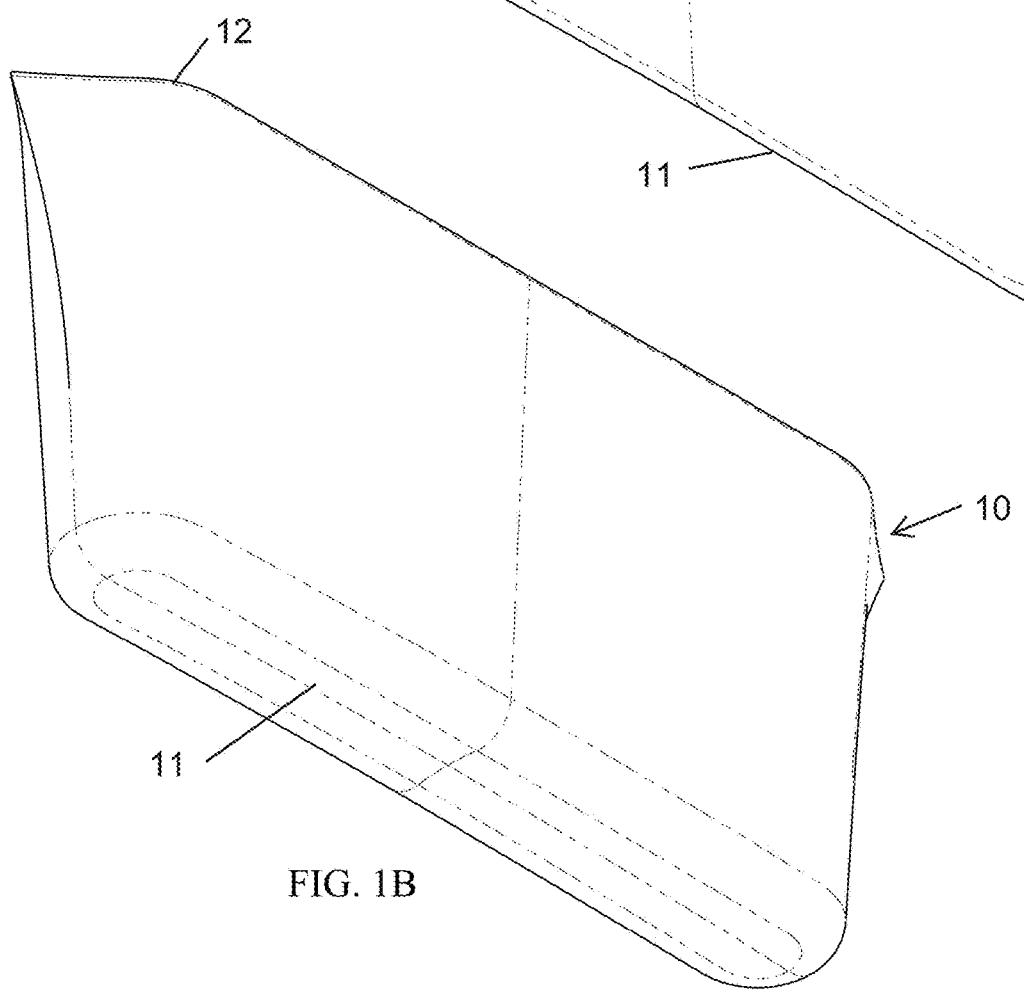
Figure 1C:
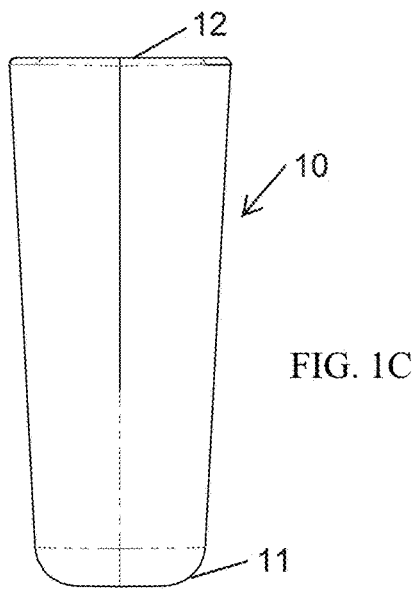
FIGS. 1C, 1D and 1E show end, side and bottom views, respectively, of the short container of FIGS. 1A and 1B.
Figure 1D:
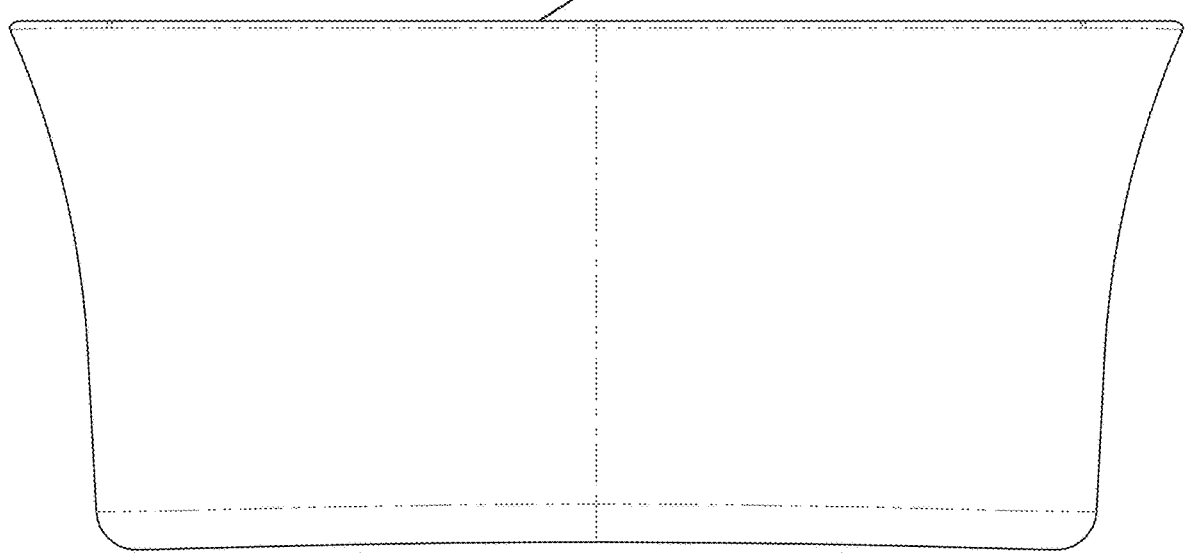
Figure 1E:
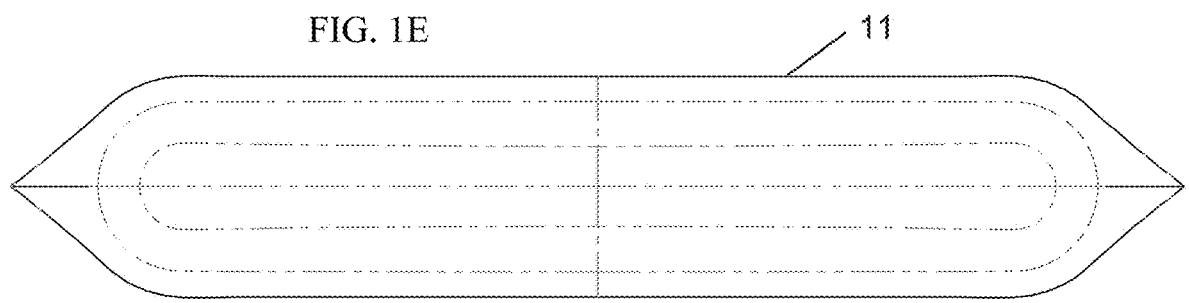

FIG. 1A is a perspective view of the short container 10 in an open configuration wherein the view is looking down through the mouth into the interior of the short container 10. FIG. 1B is a perspective view of the short container 10 in an open configuration wherein the view is looking up toward the base 11. FIG. 1C is an end view of the short container 10 in an open configuration, wherein the view from each end is identical. FIG. 1D is a side view of the short container 10 in an open configuration, wherein the views from both the front and back are identical. FIG. 1E is a bottom view of the short container 10 in an open configuration.

Figure 1F:
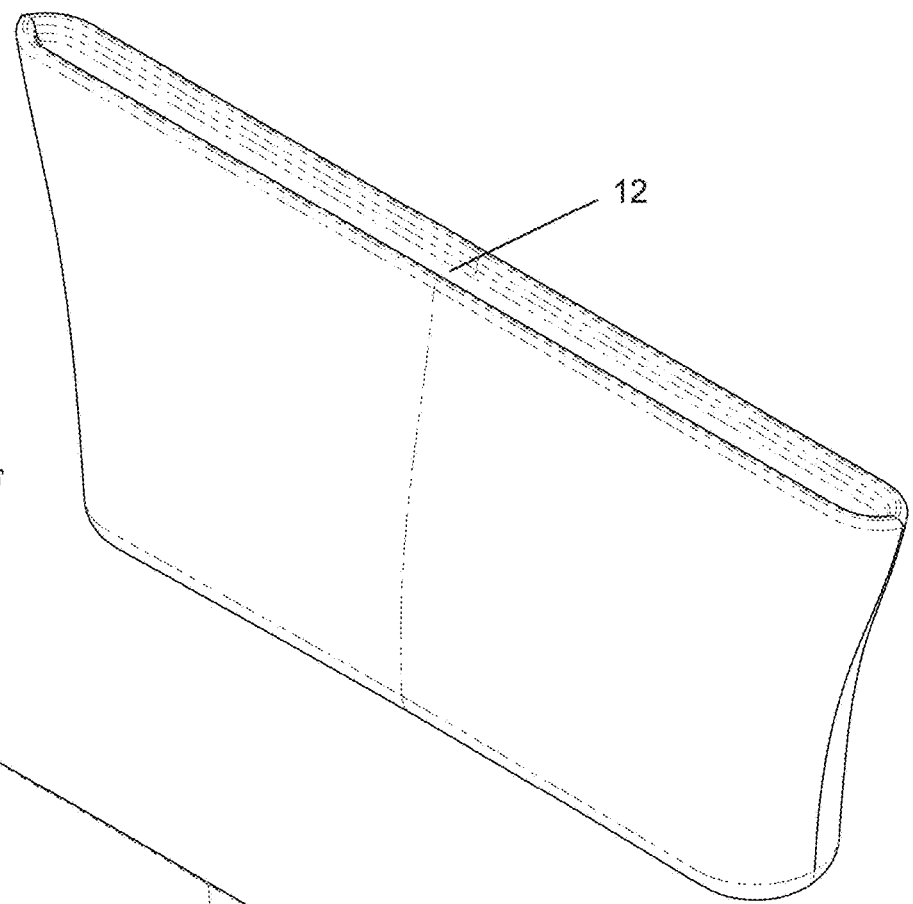
FIGS. 1F and 1G illustrate perspective views of a short container in a closed configuration.
Figure 1G:
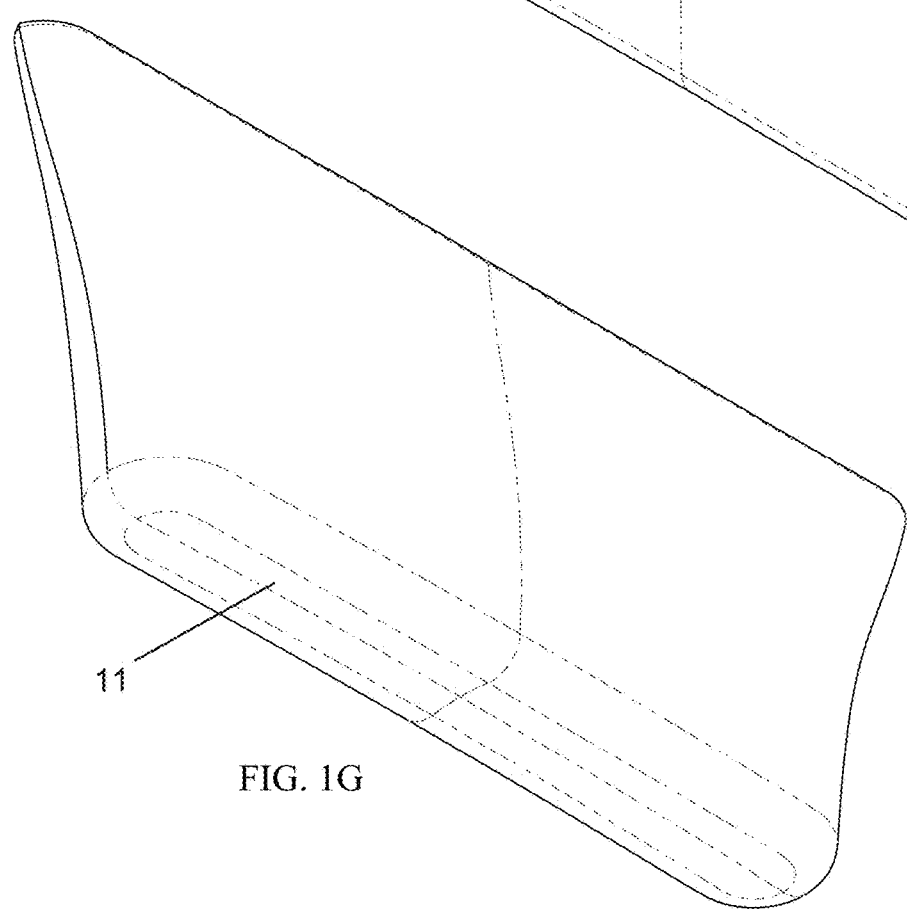

FIG. 1F is a perspective view of the short container 10 in a closed configuration wherein the view is looking down at the closed mouth 12 of the short container 10. FIG. 1G is a perspective view of the short container 10 in a closed configuration wherein the view is looking up toward the base 11. FIG. 1H is an end view of the short container 10 in a closed configuration, wherein the view from each end is identical. FIG. 1I is a side view of the short container 10 in a closed configuration, wherein the views from both the front and back are identical. FIG. 1J is a bottom view of the short container 10 in a closed configuration.

In alternative embodiments, the base 11 of the short container 10 may be any geometric shape, for example, square, rectangle, triangle, octagon, hexagon, oval, etc. Further, the mouth 12 may also be of any geometric shape. Still further, cross-sections of the short container 10 between the base 11 and the mouth 12 may be of any geometric shape. In some embodiments of the invention, the base 11, mouth 12, and cross-sections between the base 11 and mouth 12 all have the same geometric shape. In still other embodiments of the invention, the base 11, mouth 12, and cross-sections between the base 11 and mouth 12 have different geometric shapes.

FIGS. 2A-2J show perspective, side and end views of a tumbler. The tumbler 20 comprises a base 21 that is generally circular in shape. The tumbler 20 further comprises a mouth 22 at the top, wherein the mouth is generally circular when open and general linear when closed. The base 21 comprises a wall thickness and material composition that has sufficient stiffness or rigidity to resist deformation in response to applied forces. The mouth 22 comprises wall thicknesses and material compositions that are sufficiently flexible or pliable to allow the mouth 22 to be deformed between open and closed configurations. The tumbler 20 may have a zipper slot 23 near the mouth 22 to seal the mouth in a closed configuration. The tumbler 20 may have wall thicknesses and rigidity that vary uniformly from the base 21 to the mouth 22, wherein the wall thicknesses are thicker or more rigid at the base 21 and thinner or less rigid at the mouth 22.

Figure 2A:
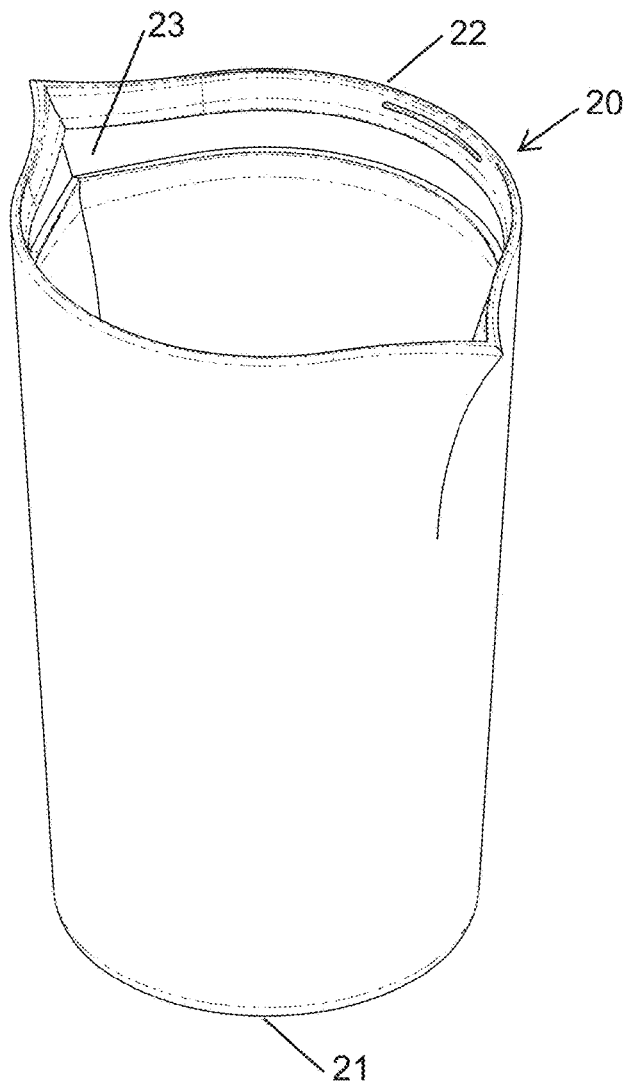
FIGS. 2A and 2B illustrate perspective views of a tumbler in an open configuration.
Figure 2B:
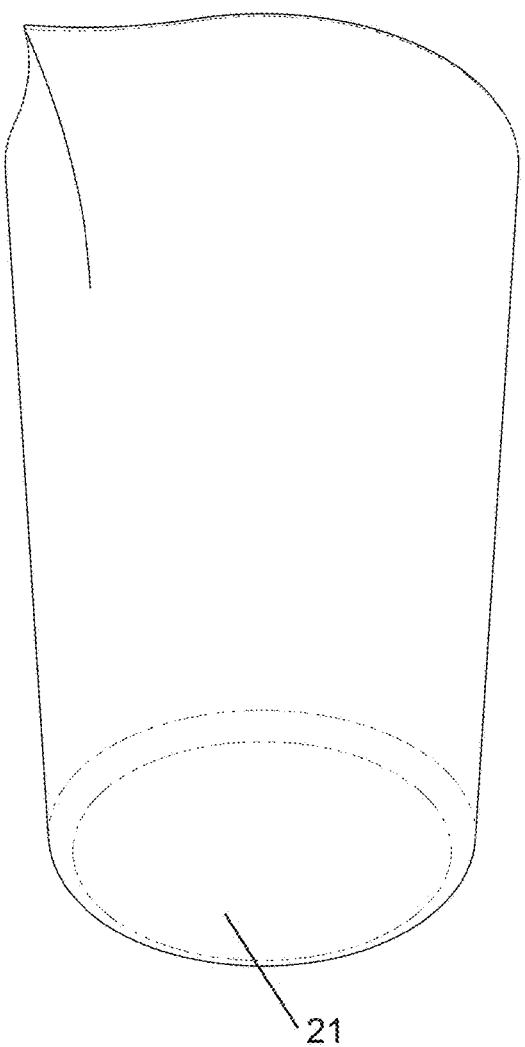

FIG. 2A is a perspective view of the tumbler 20 in an open configuration wherein the view is looking down through the mouth into the interior of the bowl 20. FIG. 2B is a perspective view of the tumbler 20 in an open configuration wherein the view is looking up toward the base 21. FIG. 2C is an end view of the tumbler 20 in an open configuration, wherein the view from each end is identical. FIG. 2D is a side view of the tumbler 20 in an open configuration, wherein the views from both the front and back are identical. FIG. 2E is a bottom view of the tumbler 20 in an open configuration.

Figures 2F, 2G:
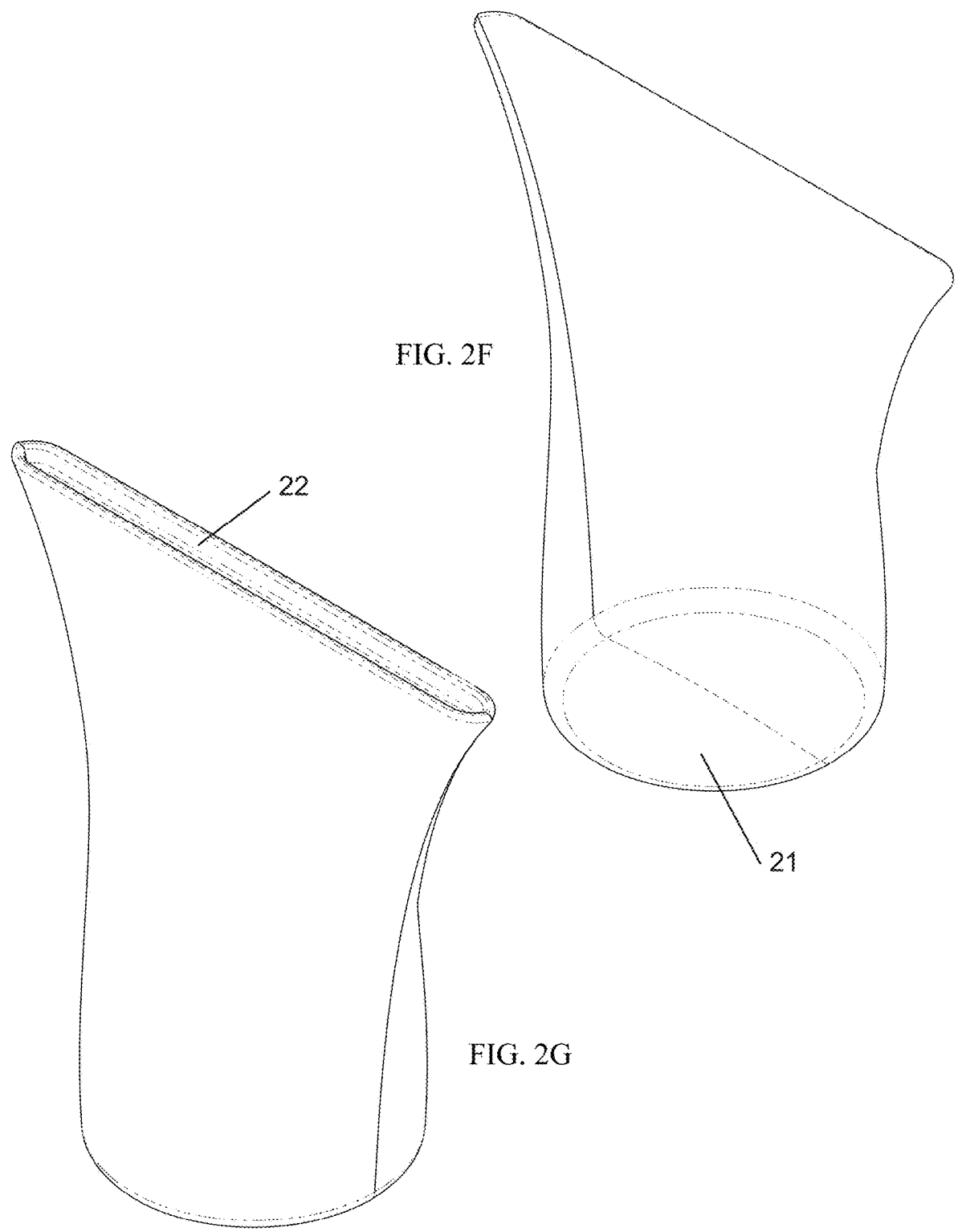
FIGS. 2F and 2G illustrate perspective views of a tumbler in a closed configuration.
Figure 2H:
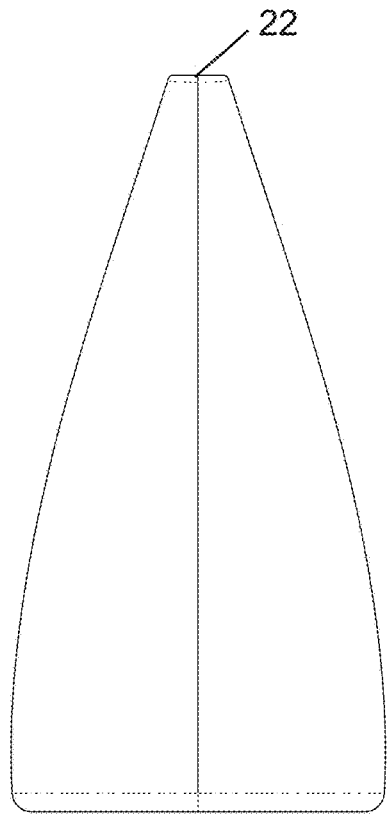
FIGS. 2H, 2I and 2J show end, side and bottom views, respectively, of the tumbler of FIGS. 2F and 2G.
Figure 2I:
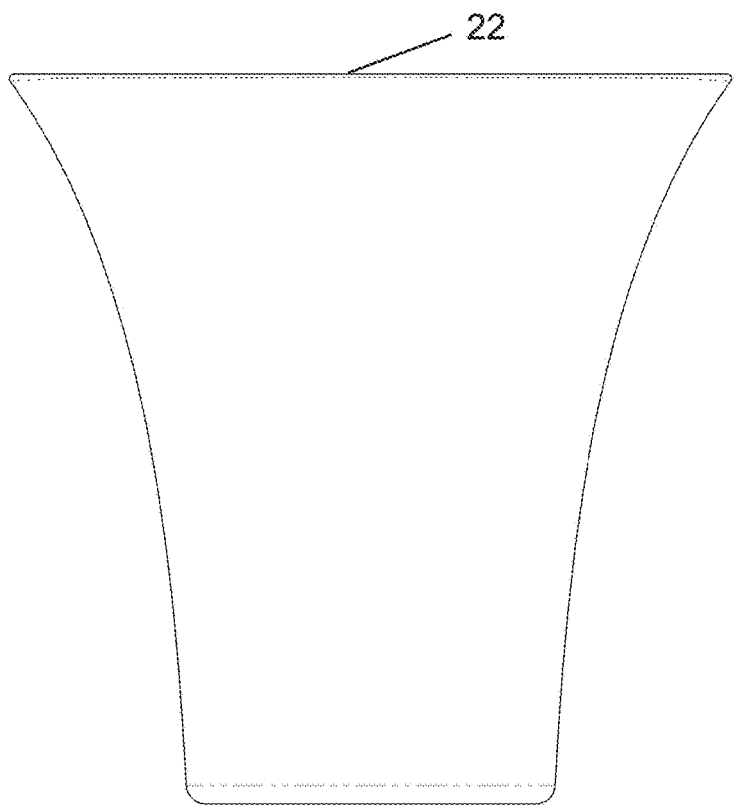
Figure 2J:
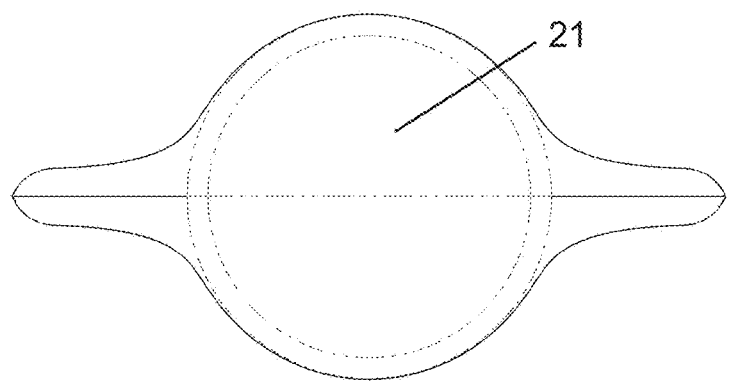

FIG. 2F is a perspective view of the tumbler 20 in a closed configuration wherein the view is looking down at the closed mouth 22 of the tumbler 20. FIG. 2G is a perspective view of the tumbler 20 in a closed configuration wherein the view is looking up toward the base 21. FIG. 2H is an end view of the tumbler 20 in a closed configuration, wherein the view from each end is identical. FIG. 2I is a side view of the tumbler 20 in a closed configuration, wherein the views from both the front and back are identical. FIG. 2J is a bottom view of the tumbler 20 in a closed configuration.

In alternative embodiments, the base 21 of the tumbler 20 may be any geometric shape, for example, square, rectangle, triangle, octagon, hexagon, oval, etc. Further, the mouth 22 may also be of any geometric shape. Still further, cross-sections of the tumbler 20 between the base 21 and the mouth 22 may be of any geometric shape. In some embodiments of the invention, the base 21, mouth 22, and cross-sections between the base 21 and mouth 22 all have the same geometric shape. In still other embodiments of the invention, the base 21, mouth 22, and cross-sections between the base 21 and mouth 22 have different geometric shapes.

Figure 3A:
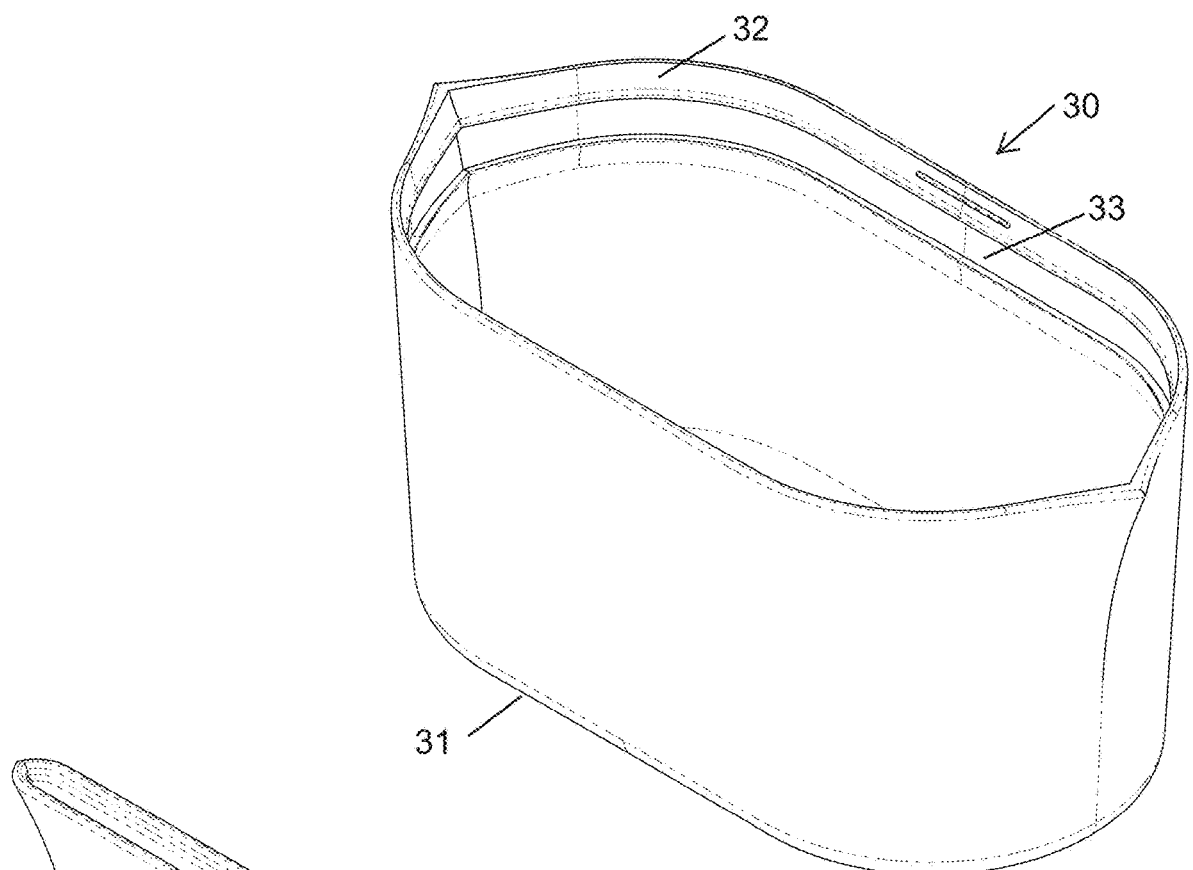
FIGS. 3A and 3B illustrate perspective views of a bowl in open and closed configurations, respectively.
Figure 3B:
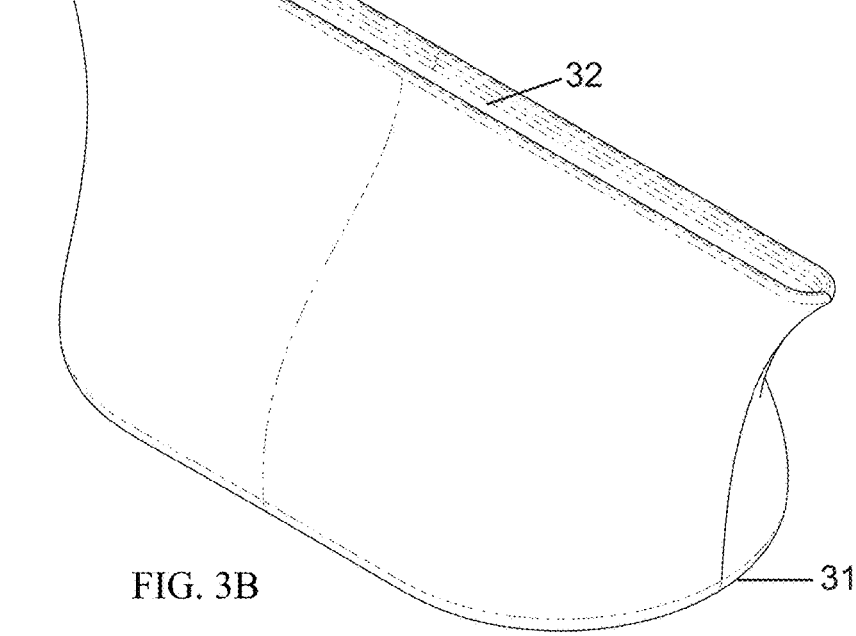

FIG. 3A is a perspective view of the bowl 30 in an open configuration wherein the view is looking down through the mouth 32 into the interior of the bowl 30. A zipper slot 33 is just inside the mouth 32. The bowl 30 stands vertically upright on a base 31. FIG. 3B is a perspective view of the bowl 30 in a closed configuration wherein the view is looking down at the closed mouth 32 of the bowl 30.

Figures 4A, 4B:
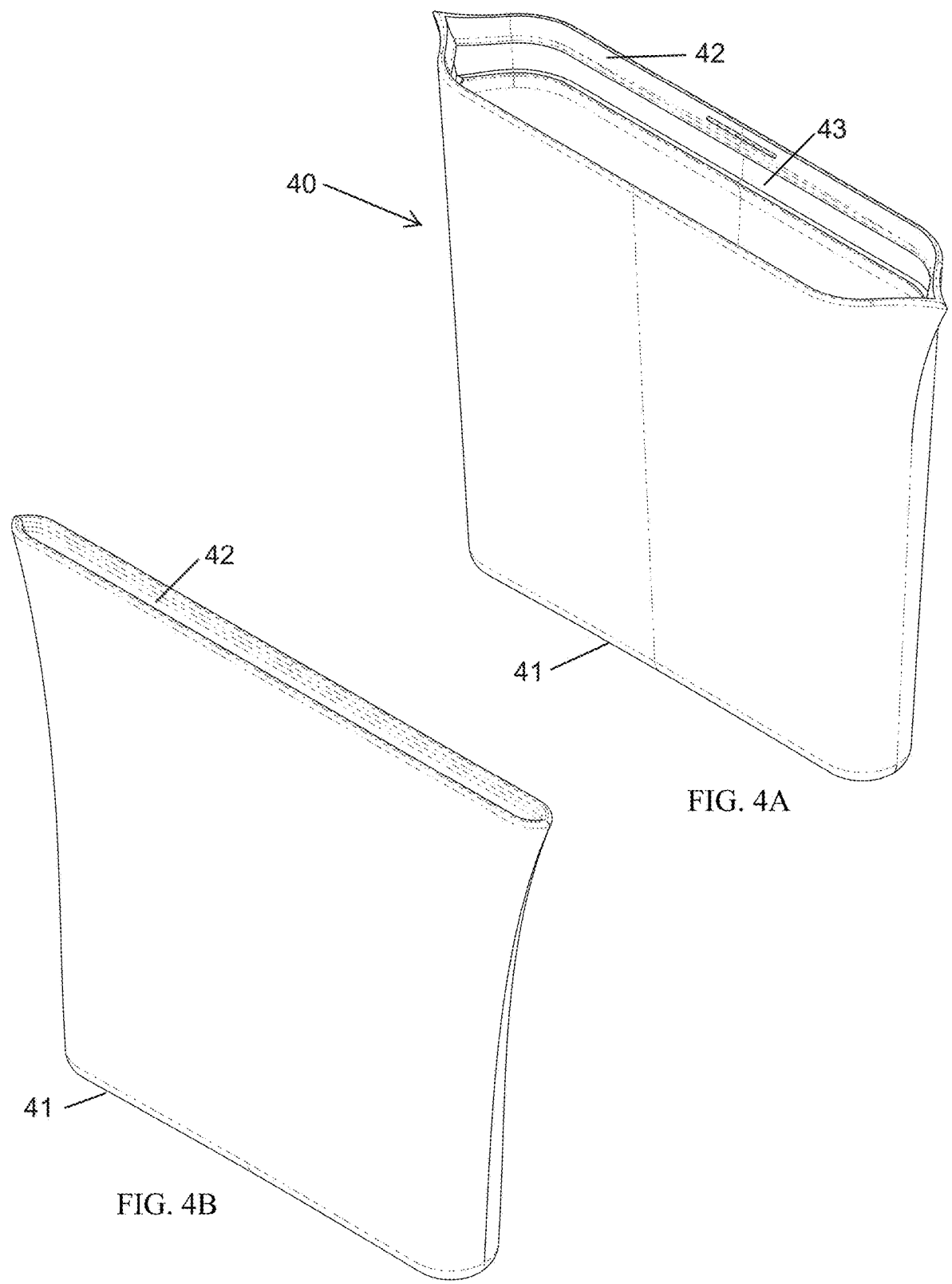
FIGS. 4A and 4B illustrate perspective views of a tall container in open and closed configurations, respectively.

FIG. 4A is a perspective view of a tall container 40 in an open configuration wherein the view is looking down through the mouth 42 into the interior of the tall container 40. The tall container 40 stands vertically on its base 41 with the mouth 42 at the top. A zipper slot 43 is just inside the mouth 42. FIG. 4B is a perspective view of the tall container 40 in a closed configuration wherein the view is looking down at the closed mouth 42 of the tall container 40.

Figure 5:
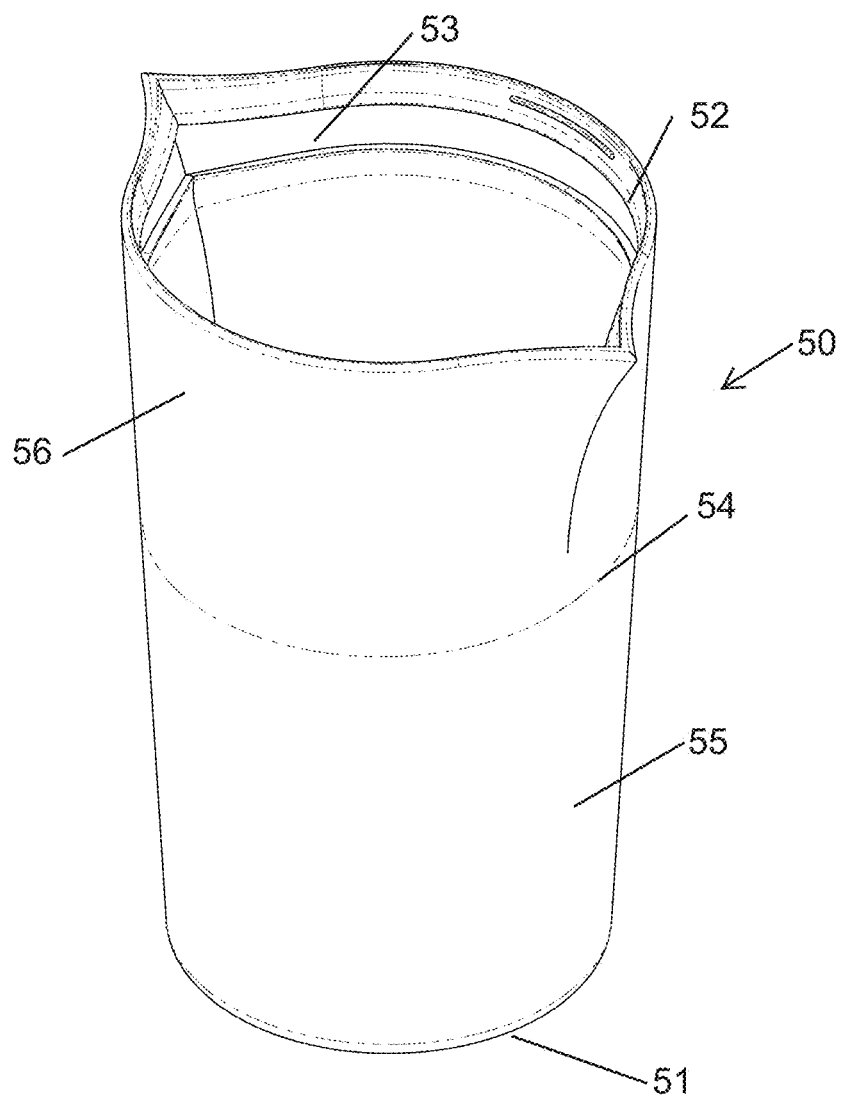
FIG. 5 illustrates a perspective view of a tumbler in an open configuration.

FIG. 5 shows a perspective view of a tumbler 50. The tumbler 50 comprises a base 51 that is circular in shape. The tumbler 50 further comprises a mouth 52 at the top, wherein the mouth 52 is generally circular when open and generally linear when closed. The tumbler 50 further comprises a rim 54 between the base 51 and the mouth 52. The tumbler 50 comprises a lower wall 55 between the base 51 and the rim 54 having a thickness and material composition that has sufficient stiffness or rigidity to resist deformation in response to applied forces, so that the tumbler 50 may freely stand vertically on its base 51. Further, the tumbler 50 has an upper wall 56 between the base 51 and the rim 54 having a wall thickness and material composition sufficiently flexible or pliable to allow the mouth 52 to be deformed between open and closed configurations. In one embodiment, the circumference of the upper wall 56 above the rim 54 may be larger than the circumference of the lower wall 55 below the rim 54, so that the upper wall 56 may be rolled or folded down over the exterior of the lower wall 55 below the rim 54. In a rolled or folded down configuration, the bowl 50 may more fully function as a traditional bowl. To seal the bowl 50, the upper wall 56 may be unrolled or unfolded to an extended position, as shown in FIG. 5, and a zipper in the zipper slot 53 may be zipped to form a seal. Embodiments of a container, cup or bowl may be similar to the tumbler 50 shown in FIG. 5.

Some embodiments of the invention, made of silicone, have base and sidewall thicknesses greater than 0.5 mm. Other embodiments of the invention, made of silicone, have base and sidewall thicknesses between about 0.7 mm and about 1.3 mm. Still further embodiments of the invention, made of silicone, have base and sidewall thicknesses of about 1.0 mm.

The tumblers, cups or bowls may be made of silicone material that is either transparent or opaque and made to be any color. The silicone may be of a quality and composition appropriate for applications in contact with foodstuffs. In particular, methyl-vinyl-polysiloxane obtained by a process of cross-linking with platinum may be an appropriate silicone. Numeric markers may be added to indicate volumetric measurements within the cups, bowls or tumblers.

Figure 6A:
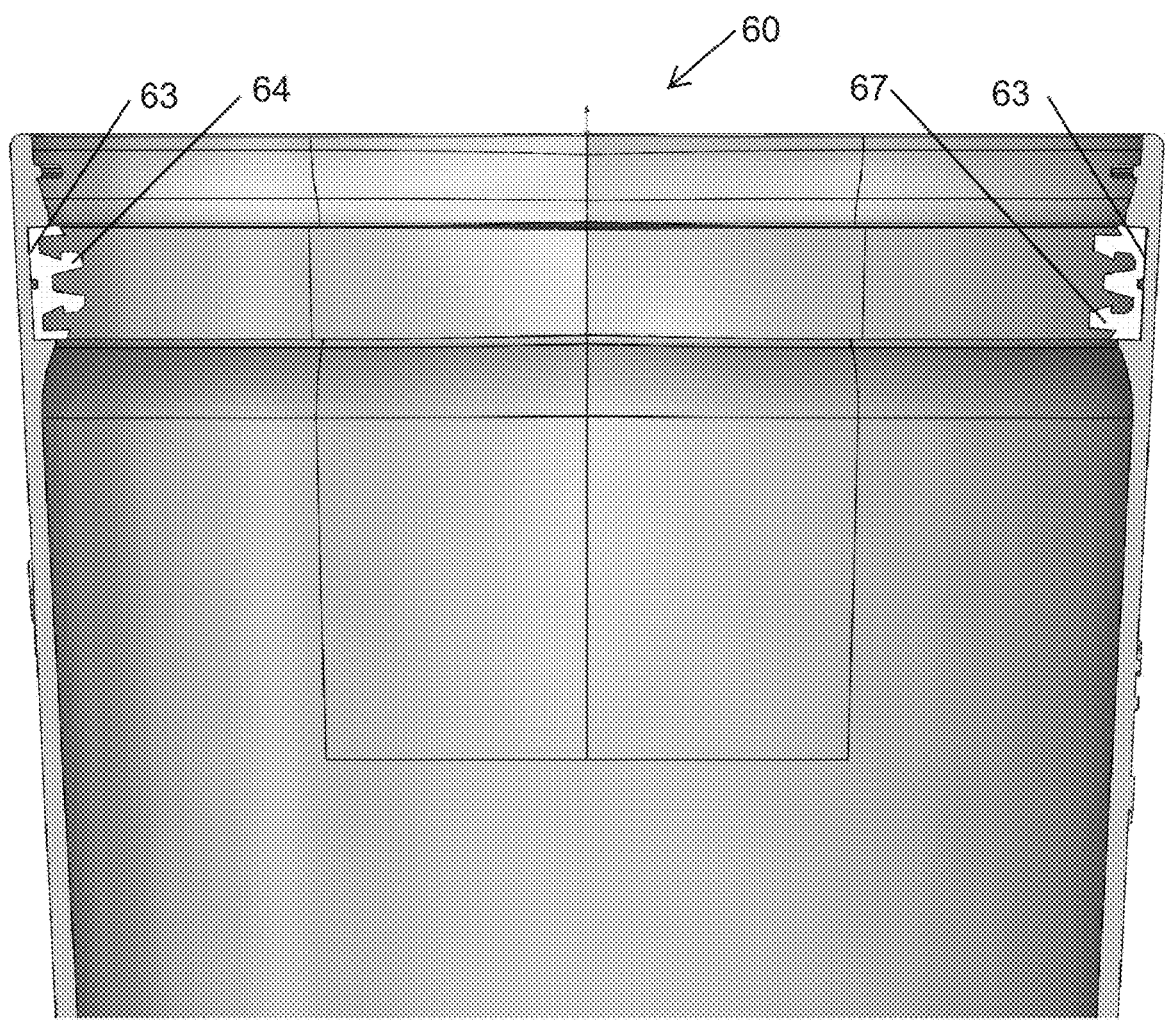
FIGS. 6A and 6B show a cross-sectional end view of a portion of a tumbler, wherein enlarged views of the zipper members are shown in FIG. 6B.

FIG. 6A shows a cross-sectional end view of an upper portion of a tumbler 60. An outward hook zipper member 64 is in the left zipper slot 63. An inward hook zipper member 67 is in the right zipper slot 63. The inward and outward hook zipper members 64 and 67 may be secured in the zipper slot 63 by any means known to persons of skill, such as gluing, bonding, fusing, etc. or simply molding the zipper members with the tumbler 60 as a unitary whole.

Figure 6B:
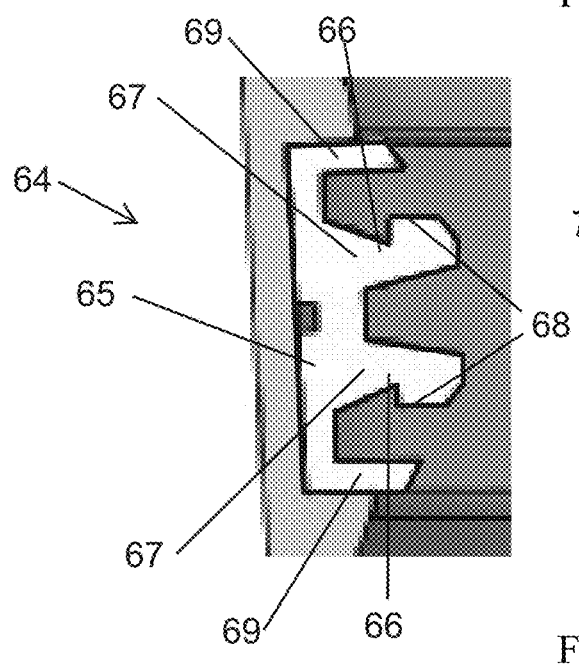
Figure 6B:
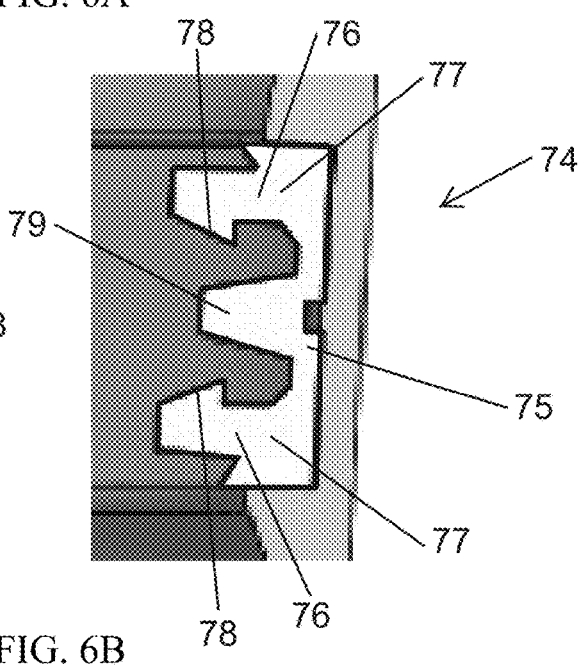

FIG. 6B shows enlarged views of the outward hook zipper member 64 and inward hook zipper member 67 of FIG. 6A. The outward hook zipper member 64 has a base 65 that is positioned in the zipper slot 63. From a central portion of the base 65, two hooks 66 extend toward an interior of the tumbler 60. Each hook 66 has a hook cantilever 67 and a hook retainer 68, wherein the hook cantilevers 67 extend substantially perpendicular from the base 65, and the hook retainers 68 extend from the distal ends of the hook cantilevers 67 substantially parallel to the base 65. The outward hook zipper member 64 is called "outward hook" because the hook retainers 68 extend in opposite directions from each other outward from a center or middle of the member. The outward hook zipper member 64 further comprises two support cantilevers 69 extending from opposite ends of the base 65.

FIG. 6B further illustrates that the inward hook zipper member 74 has a base 75 that is positioned in the zipper slot 63 opposite the outward hook zipper member 64. From the opposite end portions of the base 75, two hooks 76 extend toward an interior of the tumbler 60. Each hook 76 has a hook cantilever 77 and a hook retainer 78, wherein the hook cantilevers 77 extend substantially perpendicular from the base 75, and the hook retainers 78 extend from the distal ends of the hook cantilevers 77 substantially parallel to the base 75. The inward hook zipper member 74 is called "inward hook" because the hook retainers 78 extend in opposite directions toward each other and inward toward a center or middle of the member. The inward hook zipper member 74 further comprises a support cantilever 79 extending from a central portion of the base 75.

With reference to FIGS. 6A and 6B, the zipper members mate to seal the tumbler 60 by interlocking the hook retainers. In particular, the hooks 66 of the outward hook zipper member 64 are inserted into the respective corresponding spaces between the hooks 76 and the support cantilever 79 of the inward hook zipper member 74. Simultaneously, the hooks 76 of the inward hook zipper member 74 are inserted into the respective corresponding spaces between the hooks 66 and the support cantilevers 69. The hooks 66 and 76 are inserted into the spaces until the hook retainers 68 engage behind the hook retainers 78 and vise versa. The hook retainers 78 are supported to remain engaged with each other by the support cantilevers 69 and 79. In particular, the support cantilevers 69 press against the back sides of the hook retainers 78 to support the hook retainers 78 in engagement with the hook retainers 68. Similarly, the support cantilever 79 extends between the hooks 66 to provide support to the back sides of the hook retainers 68 to support the hook retainers 68 in engagement with the hook retainers 78. The support cantilever 79 has angled side-walls so as to wedge between the hooks 66.

Because the zipper members are made of a resilient material, i.e., platinum silicone, the hooks and supports may squeeze and bend into position for sealing engagement when the mouth 62 of the tumbler 60 is closed. The resilient material further provides sufficient rigidity to maintain the seal when the mouth 62 of the tumbler 60 is closed. Still further, the resilient material is sufficiently flexible to allow the zipper members to be pulled apart to break the seal and open the mouth 62. The closure and opening force may be such that closure and opening may be performed by hand.

According to one embodiment of the invention, the zipper members have certain dimensions. The width of the zipper slot 63 and the bases 65 and 75 of the zipper members 64 and 74 may be about 9.0 mm. The heights of the hooks 66 and 76, from the bottom of the bases 65 and 75 to the most distal ends of the hook retainers 68 and 78, may be about 4.0 mm, so that the combined thickness of a zipper slot, base and hook is less than 5.0 mm. The width of the hook retainers 68 and 78 may be about 1.7 mm.

FIG. 7A shows a perspective view of one side panel of a tumbler, wherein a cross-section is taken on the left at a center of a side of the tumbler and the other cross-section is taken on the right at an end of the tumbler. The zipper slot 83 does not have a zipper member in it, for illustration purposed. The zipper slot 83 has a slot end 85.

Figure 7B:
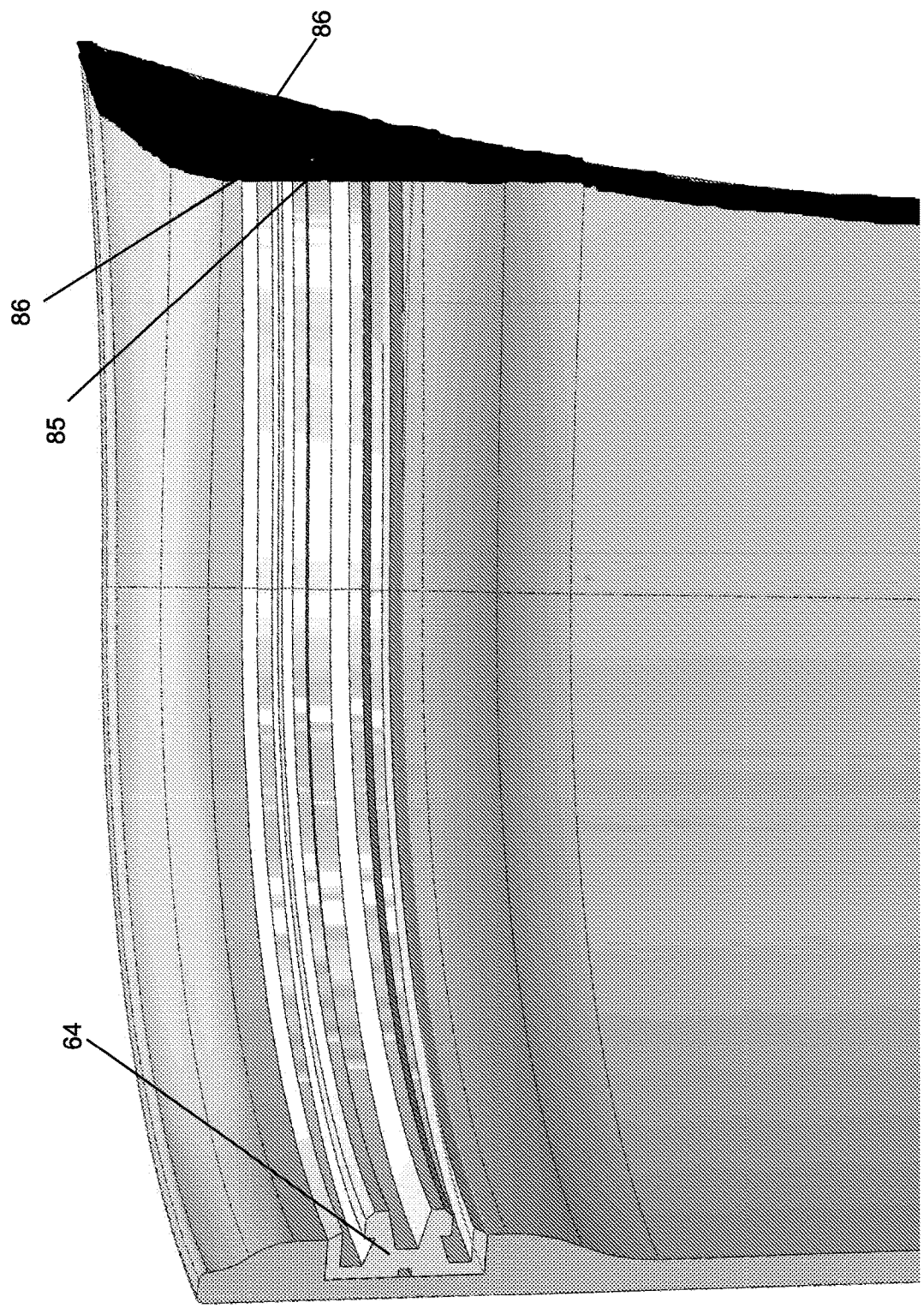
FIG. 7B shows a zipper member in the zipper slot and terminating at the slot end.

FIG. 7B shows a perspective view of the panel of the tumbler shown in FIG. 7A, except that an outward hook zipper member 84 is in the zipper slot 83. The zipper member 84 butts against the slot end 85 and is secured to it similar to the base of the zipper member being secured in the zipper slot 83. The slot end 85 is formed by a tip 86, shown in cross-section in FIG. 7B.

Figure 7C:
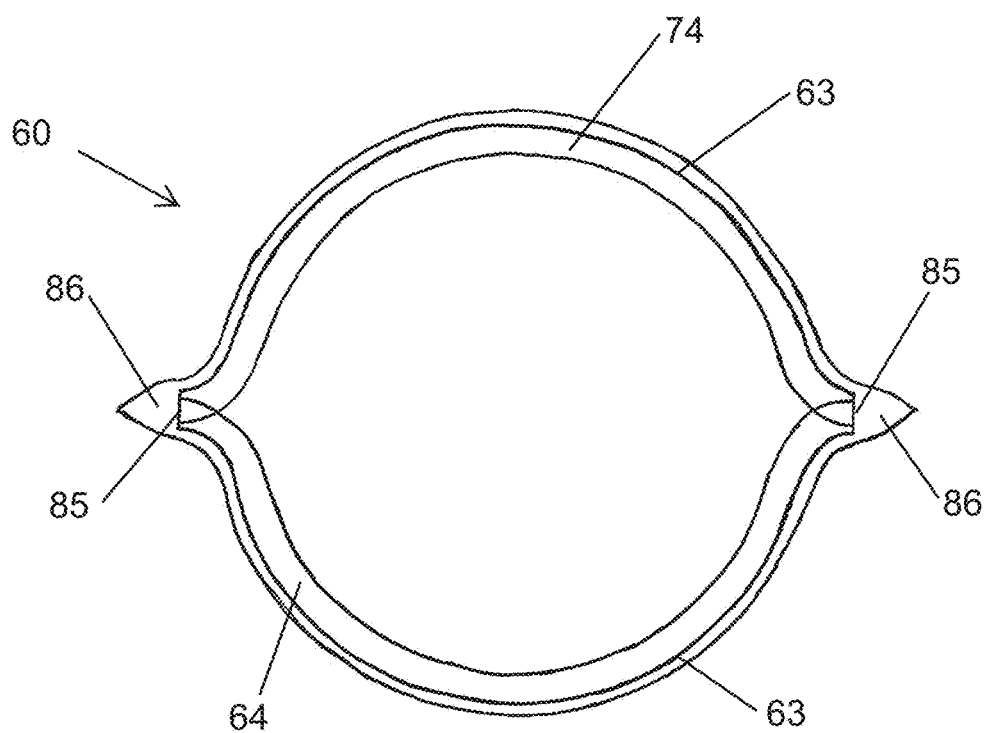
FIG. 7C shows a cross-sectional top view of a tumbler taken at the zipper members and zipper slot, wherein the zipper members terminate at a slot end.

FIG. 7C is a cross-sectional top view of the tumbler shown in FIGS. 7A and 7B. The inward hook zipper member 74 is positioned in the zipper slot 83 of one side of the tumbler 60. The outward hook zipper member 64 is positioned in the zipper slot 83 of the other side of the tumbler 60. The tumbler 60 has relatively thick tips 86 at opposite ends of the mouth 62. The tips 86 form the slot ends 85. Further, the tips 86 provide "handles" for a user to hold the tumbler 60 while closing the zipper members 64 and 74 together. The zipper members terminate at the slot ends 85 and are secured to the slot ends 85 to completely seal the mouth 62 of the tumbler 60 when closed. The zipper members 64 and 74 "cross over" each other at the slot ends 85 so that the hooks 66 and 76 are completely engaged at the slot ends 85, even when the mouth 62 of the tumbler 60 is open as shown in FIG. 7C. To close the mouth 62, a user simply squeezes the sides of the mouth 62 together and pinches the zipper members 64 and 74 together until the hooks 66 and 76 are completely engaged.

Figure 8:
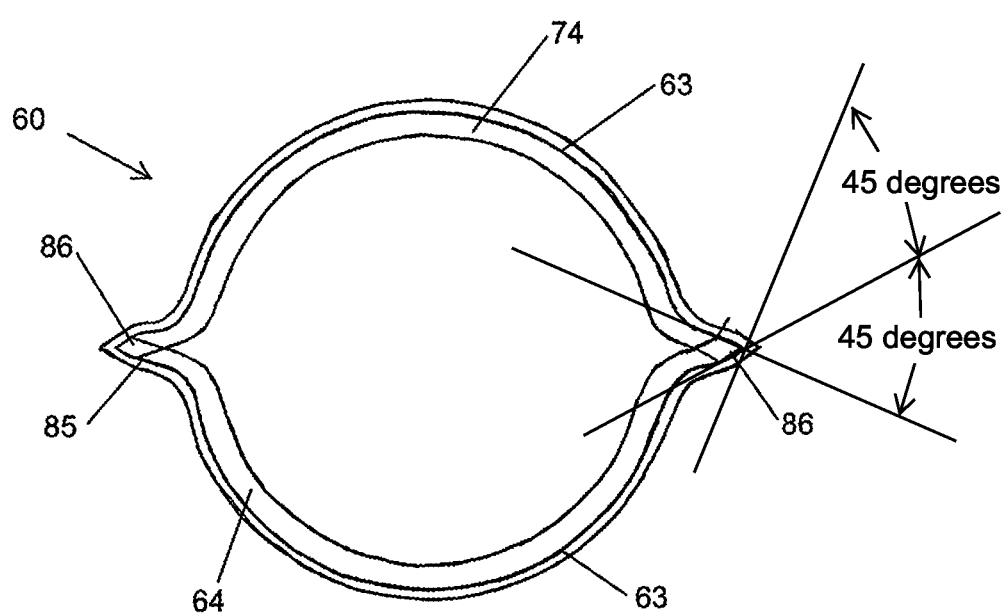
FIG. 8 shows a cross-sectional top view of a tumbler taken at the zipper members and zipper slot, wherein the zipper members terminate in the slot tip.

FIG. 8 is a cross-sectional top view of a tumbler 60. The inward hook zipper member 74 is positioned in the zipper slot 83 of one side of the tumbler 60. The outward hook zipper member 64 is positioned in the zipper slot 83 of the other side of the tumbler 60. A tip 86 is formed at each end of the mouth. The wall thicknesses in the region of the tip is approximately the same as the side walls forming the mouth 62 and the zipper slot 63. The zipper members 64 and 74 extend all the way to the tips 86 and "cross over" each other at the tips 86. The ends of the zipper members are angled at about 45 degrees, so that when the zipper members are closed together, they seal the zipper at the tips 86

Although the disclosed embodiments are described in detail in the present disclosure, it should be understood that various changes, substitutions and alterations can be made to the embodiments without departing from their spirit and scope.

What is claimed is:

1. A sealable container comprising:
   a base having a geometric shape;
   a plurality of sides extending from the base to form the container, wherein a cross-section of the plurality of sides parallel to the base has a geometric shape substantially the same as the geometric shape of the base, wherein the base and at least a portion of the plurality of sides adjacent the base are of sufficient thickness and rigidity to enable the container to freely stand vertically on its base;
   a mouth defined by the sides opposite the base, the mouth comprising:
      a first tip formed by the sides at a first end of the mouth,
      a second tip formed by the sides at a second end of the mouth,
      a first side of the plurality of sides extending from the first tip of the mouth to the second tip of the mouth,
      a second side of the plurality of sides opposite the first side and extending from the first tip of the mouth to the second tip of the mouth,
   a seal of the mouth comprising:
      a first zipper member extending from an interior face of the first side of the plurality of sides from the first tip of the mouth to the second tip of the mouth,
      a second zipper member extending from an interior face of the second side of the plurality of sides from the first tip of the mouth to the second tip of the mouth so that the second zipper member is opposite the first zipper member,
      wherein at least portions of the first and second zipper members are sufficiently resilient to be sealingly engageable with each other to maintain the seal of the mouth and disengageable between the first and second tips to break the seal of the mouth,
   wherein the mouth and seal are configured to automatically assume an open configuration when the container freely stands vertically on its base with the mouth at the top and the first and second zipper members are disengaged, the open configuration comprising an eye-shape with the first and second tips at opposite ends of the eye-shape,
   wherein the mouth and seal are configured to assume a closed configuration when the first and second zipper members are engaged with each other, and the first and second zipper members are generally linear in the closed configuration, and
   wherein the first and second sides adjacent the mouth and the first and second zipper members comprise wall thicknesses and material compositions that are sufficiently flexible or pliable to be deformable between the open configuration and the closed configuration, and
   wherein at the first and second tips, ends of the first and second zipper members are angled at about 45 degrees, so that when the zipper members are engaged, they seal the mouth at the tips.

2. The sealable container, as claimed in claim 1, wherein the first and second zipper members cross over each other so that they are engaged at the first and second tips of the mouth when the mouth is both in the open configuration and the closed configuration.

3. The sealable container, as claimed in claim 1, wherein the base, the plurality of sides, and the seal comprise silicone.

4. The sealable container, as claimed in claim 3, wherein the silicone comprises platinum silicone.

5. The sealable container, as claimed in claim 1, wherein the first and second zipper members of the seal are joined to the interior faces of the first and second sides, respectively, by joints selected from adhesive, glue, tape, weld, bond and crosslink.

6. The sealable container, as claimed in claim 1, wherein the entire container, including the base, the plurality of sides, and the seal, comprises a unitary body, with no joints nor components joined together.

7. The sealable container, as claimed in claim 1, wherein the first and second zipper members of the seal are joined to the interior faces of the first and second sides, respectively, by portions of the seal being overmolded with silicone forming the sides.

8. The sealable container, as claimed in claim 1, wherein the first zipper member comprises a male portion and the second zipper member comprises a female portion, wherein the male and female portions are engageable and disengageable.

9. The sealable container, as claimed in claim 1, wherein the container comprises at least two portions having different durometers.

10. The sealable container, as claimed in claim 1, wherein the geometric shape of the base is circular and the geometric shape of the cross-section of the plurality of sides parallel to the base is substantially circular, and the container further comprises another cross-section of the plurality of sides parallel to the base having a substantially elliptical geometric shape.

11. The sealable container, as claimed in claim 1, wherein the geometric shape of the base comprises two straight sides and two semicircular sides and wherein the geometric shape of the cross-section of the plurality of sides parallel to the base comprises two substantially straight sides and two substantially semi-circular sides.

12. The sealable container, as claimed in claim 1, wherein the base and sides have thicknesses greater than 0.5 mm.

13. The sealable container, as claimed in claim 1, wherein the base and sides have thicknesses between 0.7 mm and 1.3 mm.

14. The sealable container, as claimed in claim 1, wherein the thickness of each of the first and second zipper members of the seal is between 4.0 mm and 5.0 mm.

15. A sealable container comprising:
   a base having a geometric shape;
   a plurality of sides extending from the base to form the container, wherein a cross-section of the plurality of sides parallel to the base has a geometric shape substantially the same as the geometric shape of the base, wherein the base and at least a portion of the plurality of sides adjacent the base are between 0.7 mm and 1.3 mm thick and have sufficient rigidity to enable the container to freely stand vertically on its base;
   a mouth defined by the sides opposite the base, the mouth comprising:
      a first tip formed by the sides at a first end of the mouth,
      a second tip formed by the sides at a second end of the mouth, a first side of the plurality of sides extending from the first tip of the mouth to the second tip of the mouth, a second side of the plurality of sides opposite the first side and extending from the first tip of the mouth to the second tip of the mouth, a seal of the mouth comprising:

a first zipper member extending from an interior face of the first side of the plurality of sides from the first tip of the mouth to the second tip of the mouth, a second zipper member extending from an interior face of the second side of the plurality of sides from the first tip of the mouth to the second tip of the mouth so that the second zipper member is opposite the first zipper member, wherein at least portions of the first and second zipper members are sufficiently resilient to be sealingly engageable with each other to maintain the seal of the mouth and disengageable between the first and second tips to break the seal of the mouth, wherein the mouth and seal are configured to automatically assume an open configuration when the container freely stands vertically on its base with the mouth at the top and the first and second zipper members are disengaged, the open configuration comprising an eye-shape with the first and second tips at opposite ends of the eye-shape, wherein the mouth and seal are configured to assume a closed configuration when the first and second zipper members are engaged with each other, and the first and second zipper members are generally linear in the closed configuration, wherein the first and second sides adjacent the mouth and the first and second zipper members comprise wall thicknesses and material compositions that are sufficiently flexible or pliable to be deformable between the open configuration and the closed configuration, and wherein at the first and second tips, ends of the first and second zipper members are angled at about 45 degrees, so that when the zipper members are engaged, they seal the mouth at the tips, and wherein the first and second zipper members cross over each other so that they are engaged at the first and second tips of the mouth when the mouth is both in the open configuration and the closed configuration.

16. The sealable container, as claimed in claim 15, wherein the base, the plurality of sides, and the seal comprise silicone.

17. The sealable container, as claimed in claim 15, wherein the entire container, including the base, the plurality of sides, and the seal, comprises a unitary body, with no joints nor components joined together.

18. A silicone sealable container comprising:

a silicone base having a geometric shape;

a plurality of silicone sides extending from the base to form the container, wherein a cross-section of the plurality of silicone sides parallel to the base has a geometric shape substantially the same as the geometric shape of the base, wherein the base and at least a portion of the plurality of sides adjacent the base are between 0.7 mm and 1.3 mm thick and have sufficient rigidity to enable the container to freely stand vertically on its base;

a silicone mouth defined by the sides opposite the base, the mouth comprising:

a first silicone tip formed by the sides at a first end of the mouth, a second silicone tip formed by the sides at a second end of the mouth, a first silicone side of the plurality of sides extending from the first tip of the mouth to the second tip of the mouth, a second silicone side of the plurality of sides opposite the first side and extending from the first tip of the mouth to the second tip of the mouth, a silicone seal of the mouth comprising:

a first silicone zipper member extending from an interior face of the first side of the plurality of sides from the first tip of the mouth to the second tip of the mouth, a second silicone zipper member extending from an interior face of the second side of the plurality of sides from the first tip of the mouth to the second tip of the mouth so that the second zipper member is opposite the first zipper member, wherein at least portions of the first and second zipper members are sufficiently resilient to be sealingly engageable with each other to maintain the seal of the mouth and disengageable between the first and second tips to break the seal of the mouth, wherein the mouth and silicone seal are configured to automatically assume an open configuration when the container freely stands vertically on its base with the mouth at the top and the first and second zipper members are disengaged, the open configuration comprising an eye-shape with the first and second tips at opposite ends of the eye-shape, wherein the first and second sides adjacent the mouth and the first and second zipper members are deformable between the open configuration and a closed configuration, the first and second zipper members are generally linear in the closed configuration, wherein the mouth and seal are configured to assume the closed configuration when the first and second zipper members are engaged with each other, and the first and second zipper members are generally linear in the closed configuration, wherein the entire container, including the silicone base, the plurality of silicone sides, and the silicone seal, comprises a unitary body, with no joints nor components joined together, and wherein at the first and second tips, ends of the first and second zipper members are angled at about 45 degrees, so that when the zipper members are engaged, they seal the mouth at the tips.

19. The sealable container, as claimed in claim 18, wherein the container comprises at least two portions having different durometers.

\* \* \* \* \*